United States Patent
Berry, III

(10) Patent No.: US 10,674,230 B2
(45) Date of Patent: Jun. 2, 2020

(54) INTERACTIVE ADVERTISING AND MARKETING SYSTEM

(71) Applicant: Grab Vision Group LLC, Dayton, OH (US)

(72) Inventor: Lincoln Berry, III, Dayton, OH (US)

(73) Assignee: GRAB VISION GROUP LLC, Dayton, OH (US)

( * ) Notice: Subject to any disclaimer, the term of this patent is extended or adjusted under 35 U.S.C. 154(b) by 0 days.

(21) Appl. No.: 14/791,459

(22) Filed: Jul. 5, 2015

(65) Prior Publication Data

US 2016/0182969 A1 Jun. 23, 2016

Related U.S. Application Data

(63) Continuation-in-part of application No. 13/136,423, filed on Aug. 1, 2011, now Pat. No. 9,113,215.
(Continued)

(51) Int. Cl.
*H04N 21/81* (2011.01)
*H04N 21/4788* (2011.01)
(Continued)

(52) U.S. Cl.
CPC .......... *H04N 21/812* (2013.01); *G06Q 30/00* (2013.01); *H04N 21/2187* (2013.01); *H04N 21/4431* (2013.01); *H04N 21/4725* (2013.01); *H04N 21/4788* (2013.01); *H04N 21/47815* (2013.01); *H04N 21/6125* (2013.01);
(Continued)

(58) Field of Classification Search
CPC ......... H04N 21/23412; H04N 21/4722; H04N 21/4725; H04N 21/4728; H04N 21/858; H04N 21/8583; H04N 21/8586; H04N 21/6125; H04N 21/6582; H04N 21/812; G06Q 30/00; G06Q 30/02; G06Q 30/0241; G06Q 30/0201; H04M 3/42068; H04M 3/42042; H04M 3/42059; H04M 3/436; H04W 4/90; H04W 4/16
See application file for complete search history.

(56) References Cited

U.S. PATENT DOCUMENTS 5,774,666 A * 6/1998 Portuesi ............ G06F 17/30017
348/473
5,918,012 A * 6/1999 Astiz ................. G06F 17/30014
707/E17.013
(Continued)

OTHER PUBLICATIONS

International Search Report and Written Opinion for International Patent Application (PCT No. PCT/US16/40945; filed Jul. 5, 2016) dated Nov. 21, 2017.

*Primary Examiner* — Robert J Hance
*Assistant Examiner* — Jen-Shi Huang
(74) *Attorney, Agent, or Firm* — Mark F. Smith; Smith Brandenburg Ltd

(57) ABSTRACT

The current invention is an interactive advertising and marketing system that operates to provide users with an opportunity to identify objects within video media and create virtual hotspots with respect to the objects, which allows viewers the ability to select objects within the video media that are associated with one of the hotspots, and transmits their interest in the selected object to one or more users. Preferably, the system operates such that hotspots can be created for previously created video, newly created video media, as well as live broadcasts.

7 Claims, 22 Drawing Sheets

Related U.S. Application Data

(60) Provisional application No. 61/400,582, filed on Jul. 30, 2010.

(51) Int. Cl.

| | | |
|---|---|---|
| *H04N 21/61* | (2011.01) | |
| *H04N 21/2187* | (2011.01) | |
| *H04N 21/4725* | (2011.01) | |
| *H04N 21/443* | (2011.01) | |
| *H04N 21/478* | (2011.01) | |
| *H04N 21/658* | (2011.01) | |
| *H04N 21/858* | (2011.01) | |
| *H04N 21/8352* | (2011.01) | |
| *G06Q 30/00* | (2012.01) | |

(52) U.S. Cl.
CPC ..... *H04N 21/6582* (2013.01); *H04N 21/8352* (2013.01); *H04N 21/8583* (2013.01)

(56) References Cited

U.S. PATENT DOCUMENTS

| | | | | |
|---|---|---|---|---|
| 6,169,573 | B1* | 1/2001 | Sampath-Kumar | G06K 9/32 348/169 |
| 6,256,785 | B1* | 7/2001 | Klappert | H04N 5/4401 348/E5.002 |
| 6,496,981 | B1* | 12/2002 | Wistendahl | G11B 27/034 345/619 |
| 6,637,028 | B1* | 10/2003 | Voyticky | H04H 60/39 725/109 |
| 7,325,245 | B1* | 1/2008 | Clapper | G06F 17/30017 707/E17.009 |
| 7,343,617 | B1* | 3/2008 | Katcher | H04N 21/23431 725/61 |
| 7,487,112 | B2* | 2/2009 | Barnes, Jr. | G06Q 10/02 705/26.8 |
| 7,577,978 | B1* | 8/2009 | Wistendahl | A63F 13/12 725/109 |
| 7,779,438 | B2* | 8/2010 | Davies | H04N 5/783 725/135 |
| 7,814,511 | B2 | 10/2010 | Macrae et al. | |
| 7,885,951 | B1* | 2/2011 | Rothschild | G06F 17/30047 705/37 |
| 7,979,877 | B2 | 7/2011 | Huber et al. | |
| 8,813,132 | B2* | 8/2014 | Andrews, II | G06Q 30/02 725/139 |
| 8,952,791 | B2 | 2/2015 | Berry, III et al. | |
| 9,113,215 | B1* | 8/2015 | Berry, III | H04N 21/4722 |
| 2001/0027559 | A1* | 10/2001 | Tanabe | H04N 7/17318 725/1 |
| 2002/0056136 | A1* | 5/2002 | Wistendahl | G06F 17/30017 725/135 |
| 2002/0059584 | A1* | 5/2002 | Ferman | G06F 17/30017 725/34 |
| 2002/0162117 | A1 | 10/2002 | Pearson et al. | |
| 2003/0028873 | A1 | 2/2003 | Lemmons | |
| 2003/0131357 | A1 | 7/2003 | Kim | |
| 2003/0149983 | A1 | 8/2003 | Markel | |
| 2004/0021684 | A1* | 2/2004 | B. Millner | H04N 21/23431 715/719 |
| 2004/0169587 | A1 | 9/2004 | Washington | |
| 2004/0233233 | A1* | 11/2004 | Salkind | G06T 7/20 715/719 |
| 2005/0229227 | A1 | 10/2005 | Rogers | |
| 2005/0285742 | A1 | 12/2005 | Charych et al. | |
| 2006/0129908 | A1* | 6/2006 | Markel | H04L 29/06027 715/202 |
| 2006/0259930 | A1* | 11/2006 | Rothschild | G11B 27/11 725/81 |
| 2006/0268007 | A1 | 11/2006 | Gopalakrishnan | |
| 2007/0033264 | A1* | 2/2007 | Edge | H04L 29/12066 709/217 |
| 2007/0136773 | A1* | 6/2007 | O'Neil | H04N 7/17318 725/100 |
| 2007/0192164 | A1* | 8/2007 | Nong | G06Q 30/02 715/275 |
| 2008/0042847 | A1 | 2/2008 | Hollister et al. | |
| 2008/0126191 | A1* | 5/2008 | Schiavi | G06Q 30/02 705/14.56 |
| 2008/0143481 | A1 | 6/2008 | Abraham et al. | |
| 2008/0154908 | A1* | 6/2008 | Datar | G11B 27/11 |
| 2008/0201734 | A1* | 8/2008 | Lyon | G06Q 30/0251 725/34 |
| 2009/0007023 | A1* | 1/2009 | Sundstrom | G06F 3/0481 715/858 |
| 2009/0077459 | A1* | 3/2009 | Morris | H04N 5/44508 715/201 |
| 2009/0083815 | A1* | 3/2009 | McMaster | H04N 7/17318 725/110 |
| 2009/0144772 | A1* | 6/2009 | Fink | G06Q 30/02 725/42 |
| 2009/0276805 | A1* | 11/2009 | Andrews, II | G06Q 30/02 725/35 |
| 2010/0064220 | A1* | 3/2010 | Sankaranarayan | H04N 21/8586 715/719 |
| 2010/0086283 | A1* | 4/2010 | Ramachandran | H04N 5/44591 386/241 |
| 2010/0154007 | A1* | 6/2010 | Touboul | G06Q 30/02 725/60 |
| 2010/0235391 | A1 | 9/2010 | Eklund, II | |
| 2010/0283678 | A1 | 11/2010 | Ketonen | |
| 2011/0043626 | A1* | 2/2011 | Cobb | G06K 9/00771 348/143 |
| 2011/0052144 | A1* | 3/2011 | Abbas | G11B 27/034 386/240 |
| 2011/0099064 | A1 | 4/2011 | Lyon et al. | |
| 2011/0137753 | A1* | 6/2011 | Moehrle | G06Q 30/02 705/27.1 |
| 2013/0074121 | A1 | 3/2013 | Berry et al. | |
| 2013/0262588 | A1* | 10/2013 | Barak | H04L 67/22 709/204 |
| 2016/0182969 | A1 | 6/2016 | Berry, III | |

* cited by examiner

AVERAGE VISIBLE TIME = (T1 + T2 + T3)/3

AVERAGE SIZE = (S1 + S2 + S3)/3

AVERAGE DISTANCE FROM CENTER = (D1 + D2 + D3)/3

INTERACTIVE ADVERTISING AND MARKETING SYSTEM

CROSS-REFERENCE TO RELATED APPLICATION

The present application is a Continuation-In-Part of U.S. patent application Ser. No. 13/136,423, filed Aug. 1, 2011, which claims benefit of U.S. Provisional Patent Application having Ser. No. 61/400,582, filed Jul. 30, 2010, the disclosure of both applications are hereby incorporated by reference in their entirety.

BACKGROUND OF THE INVENTION

The present invention relates to a video advertisement and marketing system, and more particularly to a video advertising and marketing system using video media that provides a collaborative process in which "users", such as advertisers, can incorporate material, such as advertisements, products, objects, or other information, material and items (hereinafter referred collectively as "objects"), in various video media, preferably digital video media, and whereby "viewers" (those watching the video media) can communicate with said users concerning the object. In a preferred embodiment, the system allows users, to identify objects within a video media, such as used in television broadcasts and clips, DVD's and BLU-RAY optical discs, movies and movie clips, music videos, video files, streaming videos over Internet, and other such video media (hereinafter referred collectively as "video media"); and permits viewers to select objects within such video media and utilize the advertisement and marketing system to communicate and interact with users and other viewers.

Audiences today are often confronted with a daily surplus of social information that competes for an individual's attention in almost every aspect of their work, recreation, and social lives. A popular form of advertising on large private or public networks, such as the Internet, is through the use of video files that provide short digital video transmissions, known as "streaming." Individuals also generally frequently view web sites to obtain information, such as news, weather information, entertainment information, broadcast information, much of which is communicated using digital video files. Such individuals also utilize other various video media for obtaining information and communicating with other viewers. Thus, because such media provides access to a large population, businesses seek and use such media to advertise their products and services.

Use of advertising in such video media has increased significantly in recent years with the advent of new telecommunication means, including cell phones, texting, TWITTER and the Internet. Such telecommunication means have been successful in connecting large numbers of people through various means that include online bulletin boards, Email, Tweeting, and online instant messaging. Accordingly, a single video media is often shared among a great number of people.

An assortment of such video media that is frequently viewed or downloaded contain hotspots (certain defined "clickable" areas in a digital video media) that have been embedded or incorporated within the video media. Such hotspots include defined areas that are typically associated with an image shown in the video media such that when the viewer "clicks" on an area incorporating the hotspot a certain action results. This action may include establishing communication with a user, such as an advertiser, by use of a hyperlink to an advertiser's web site. One problem with use of conventional hotspots is that each hotspot corresponding to an object must be placed within the video media prior to viewing by the public. This embedding process is relatively time consuming and expensive. Further, older video media, would not have the incorporation of embedded hotspots, and therefore could not be used by advertisers. Another problem with the use of conventional hotspots is that the embedded hotspots in a video media are usually permanent and cannot be removed, or changed, or additional hotspots added except by making such changes to each video media, such as individual movies, DVD's, video files, and the like. Further, current systems incorporating hotspots in video media cannot be used to incorporate or embedded hotspots in live video broadcasts, such as a live television broadcast.

Conventional hotspots are hyperlinks that have a visual geometric region, grid, polygon, image segmentation, image map, vector outline, or other such shape and are typically overlaid over a given video media and may be visually transparent until viewer interaction. A hyperlink is a link that receives information, typically upon viewer interaction, such as a mouse or touch screen clicks. Hyperlinks may be visual regions such as a text string or cue points that are synchronized to some form of time code. Some of these methods allow hyperlinks to be dynamically added, modified, or removed. Sometimes hotspots are hidden to prevent them from visually interfering with the viewer's viewing experience. Therefore, a viewer may not even know that a hotspot or hotspots are available if there are no visual indicators or cues that such hotspots may exist. While there are a variety of methods that allow a viewer to interact with hyperlinks that are either embedded within or overlaid atop of a given video media, a problem arises when there are no hyperlinks whatsoever for a viewer to interact with.

In addition, a viewer's intent may be ambiguous when faced with visual anomalies with a video media, such as local interference, pixilation, striping, mosaic, slow connection speeds, stuttering, synchronization, time code error, or other such interference. Moreover, a video media may contain a visual image that itself is distressed by choppiness, focus blur, motion blur, clipping, strobing, and other such visual distress. For example, a high-speed chase scene in an action movie may cut to different angles too rapidly for a viewer to keep up with, or an object of interest might be moving too quickly across a scene for a viewer to identify. Thus, a viewer might miss the opportunity to interact with a conventional hotspot and may have the inconvenience of having to pause and rewind the video media repeatedly in order to compensate. Further, because of the speed of the changing scenes, a viewer may miss the object of interest. For example, a viewer may be interested in a tie being worn by an actor and attempts to use a mouse, smart remote, touch-enabled screen, or other input device to click on the tie. However, because of the speed of the changing scenes, the viewer may miss the intended target object or the opportunity to click on the tie passes and the tie is no longer visually within the viewer's reference frame. Further, users are interested in placing advertising (products) and/or hotspots in video media that have a high probability that a viewer will see or notice the advertising (such as a product). Unfortunately, until now there is no easy and effective way for a user to evaluate video media to determine the likelihood of a viewer noticing or seeing the advertisement (such as a product) displayed in the video media. Accordingly, it would be desirable to have a system that operates to definitively predict whether or not a viewer will see an advertisement (such as a product or object) while viewing a video media and without the need for a viewer to actually click/interact with the object placement (prior to incorporating a hotspot into the video media for the advertisement or object).

Accordingly, it would be desirable to have an interactive advertising and marketing system for video media that provides a system and process in which users, such as advertisers, can identify objects within a video media, including previously recorded video media and live broadcasts, that allows users to add, subtract and modify hotspots, and which allows viewers to select objects and communicate with and interact with users.

SUMMARY OF THE INVENTION

The current invention is an interactive advertising and marketing system that operates to provide users with an opportunity to identify objects within video media and create virtual hotspots with respect to the objects, which allows viewers the ability to select objects within the video media that are associated with one of the hotspots, and transmits their interest in the selected object to one or more users. Preferably, the system operates such that hotspots can be created for previously created video, newly created video media, as well as live broadcasts.

In a preferred embodiment of the invention, the interactive advertising and marketing system of the subject invention provides users with means for receiving information, such as specific business information concerning the viewer's demographics and other information concerning the effectiveness of the advertising.

In another preferred embodiment of the invention the interactive advertising and marketing system allows advertising to be incorporated into video media whereby viewers can select "click" objects and interact with users.

In another preferred embodiment of the invention the interactive advertising and marketing system provides users the ability to obtain viewer information for sending trackable coupons, maps, and other customized information materials to the viewers.

In another preferred embodiment of the invention the interactive advertising and marketing system provides users with the ability to add, subtract and edit hotspots associated with objects within a specific video media.

In another preferred embodiment of the invention the interactive advertising and marketing system provides users with means for selecting targeted geographic and/or demographic audiences.

In another preferred embodiment of the invention the interactive advertising and marketing system provides users the ability to receive marketing reports ("analytics") that provide information concerning advertising effectiveness.

In another preferred embodiment of the invention the interactive advertising and marketing system provides users the ability to embed hotspots into various video media that can be transmitted to other viewers such as by Email, TWITTER communication, FACEBOOK pages, and other similar communication systems.

In another preferred embodiment of the invention, the advertising and marketing system operates to place a viewer's display device adapted for receiving transmission of video media in communication with the system for identifying hotspots within a video media.

In another preferred embodiment of the invention the advertising and marketing system operates to create a display having a sign-up field that when selected by the viewer the system software operates to register the viewer with the system.

In a preferred embodiment of the invention the system software operates in conjunction with the video display such that when material is selected by a viewer the video display transfers a video image ("snapshot" or "screenshot") of the video media to the system which then directs the system software to operate and calculate the coordinates of the area selected by the user and stores the video image in a data bank or "cloud".

In another preferred embodiment of the interactive advertising and marketing system the video media is operable on assortment of devices capable of viewing video media.

In a preferred embodiment of the interactive advertising and marketing system, the assortment of devices are capable of utilizing web pages, Emails, Twitter feeds, cellular transmittals, cellular text messages, Internet instant messages, and social network systems.

Preferably the interactive advertising and marketing system for use by users for advertising and marketing objects in a video media and by viewers for selecting such objects, comprises a data bank having a plurality of hotspots, each hotspot is directed to a corresponding object, a viewer video display device operable for receiving and displaying a video media, a selection device or method for selecting an object in the video media, and a system framework in communication with the data bank "cloud" and the viewer display device and operable for determining if a hotspot exists for the selected object; wherein if a hotspot exists for the selected object, the user/viewer module directs the video display device to generate a dialogue (such as a window) for allowing a viewer to correspond with a user.

In a preferred embodiment, the viewer video display device is selected from the group consisting of televisions, cell telephones, computer displays, personal digital assistants, video game consoles, and virtual/Augmented Reality devices.

In another preferred embodiment the system framework operates to allow users to add, subtract, or modify hotspots for objects stored in the cloud.

In another preferred embodiment the system framework operates to record the demographics of viewers and videos media being viewed by the viewers.

In another preferred embodiment the system framework operates to connect a viewer video display device with a user website.

Another preferred embodiment of the invention is a method of advertising and marketing comprising the steps of: identifying a viewer, the viewer selecting an object in a video media, calculating the coordinates of the selected object, using the coordinates to identify any hotspots for the object in the video media, using the hotspot to identify the object and a user associated with the object, and providing a dialogue whereby the viewer and the user may communicate.

In a preferred embodiment of the invention the video media is displayed on a viewer display device.

In a preferred embodiment the connection whereby a viewer can contact the user is an Internet connection.

In a preferred embodiment the connection whereby a viewer can contact the user is in the form of a dialogue, such as a window, appearing on the viewer's display device.

In a preferred embodiment of the invention the dialogue operates to allow a viewer to receive and transmit messages to other viewers.

In a preferred embodiment of the invention the dialogue operates to allow a user to receive and transmit messages to viewers.

A preferred embodiment of the invention is a method of advertising and marketing comprising a framework for performing the steps of at least one user selecting at least one object in a video media, overlaying a hotspot for each selected at least one object in the video media such that the hotspots overlay the video media, and viewing the video media on a viewer video display by at least one viewer wherein when at least one object is selected, the framework operates to provide communication between at least one user and at least one viewer.

In another preferred embodiment of the interactive advertising and marketing system for use by users for advertising and marketing objects in a video media and by viewers for selecting such objects operates to provide users the ability to evaluate advertising effectiveness by determining the likelihood that an object will be observed by the viewer in watching a video media;

In another preferred embodiment of the interactive advertising and marketing system for use by users for advertising and marketing objects in a video media and by viewers for selecting such objects operates such that if the viewer selects a point (clicks on a point) that an object does not appear at the coordinates of the selected point on a display frame, the system operates to determine the most likely object that the viewer was attempting to click on (select).

In a preferred embodiment of the invention, the most likely object is an object having the same or similar coordinates that appears in a sequential display frame.

In a preferred embodiment of the invention, the most likely object is an object that is moving into or out of the coordinates of the selected point in a sequential display frame.

In a preferred embodiment of the invention, the most likely object is the closest object having a hotspot to the selected point.

These and other benefits, advantages, and embodiments of the invention will be apparent from the following description, the accompanying drawings and the appended claims.

BRIEF DESCRIPTION OF THE DRAWINGS

Features, aspects, and advantages of the present invention will become better understood with regard to the following description, appended claims, and accompanying drawings where:

DETAILED DESCRIPTION OF THE PREFERRED EMBODIMENT

The present invention solves the prior art problems discussed above and provides a distinct advance in the state of the art. The current invention is an interactive advertising and marketing system that operates to provide users with an opportunity to identify objects within video media and create hotspots within such video media, which allows viewers the ability to select ("click") objects within the video media that are associated with one of the hotspots, and transmits their interest in the object to a user. Preferably the system operates such that hotspots can be created for previously created video, newly created video media, as well as live broadcasts.

Figure 1:
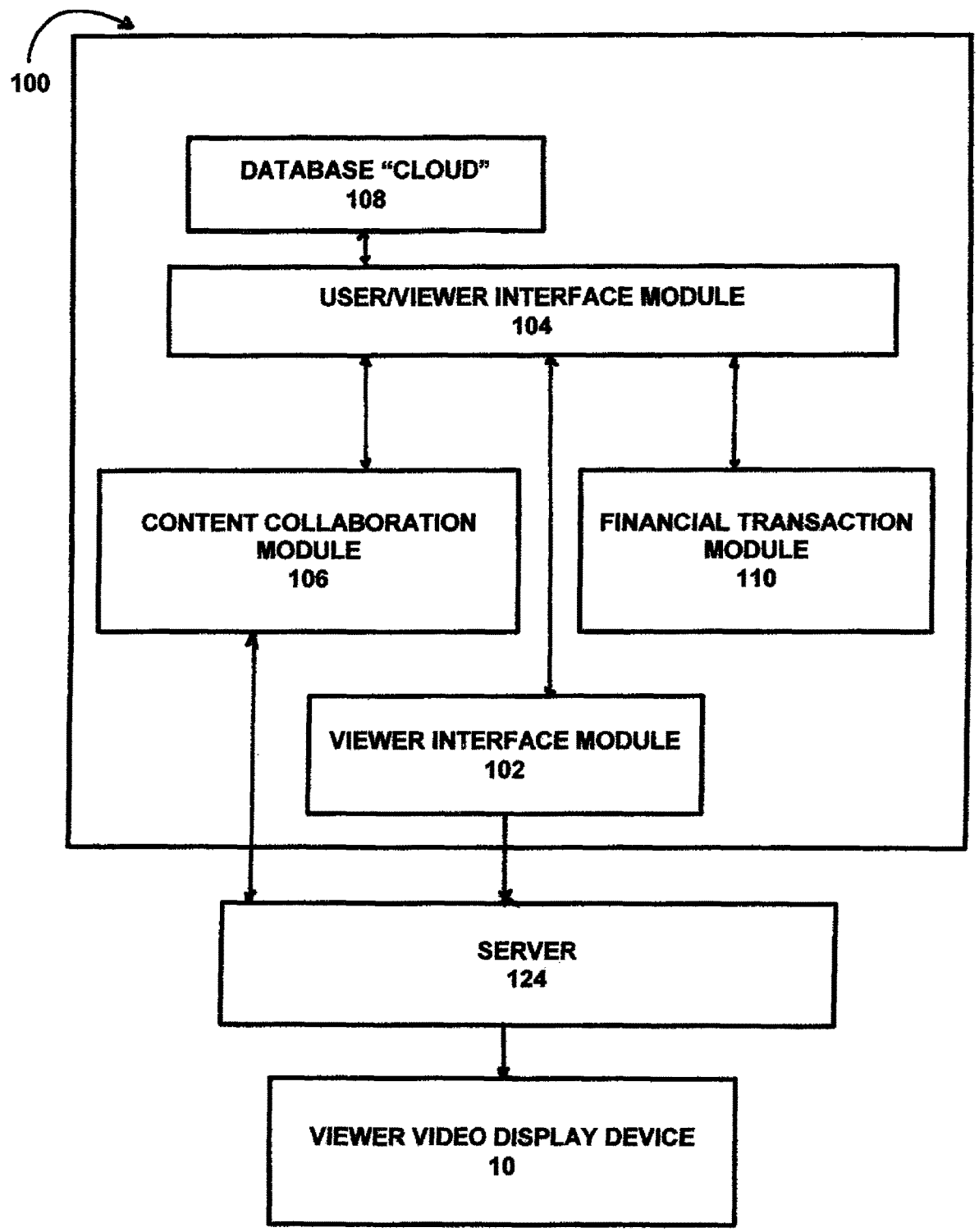
FIG. 1 is a diagrammatic representation showing the general methodology of the interactive advertising and marketing system of the subject invention showing a user/viewer interface module, a content collaboration module, a viewer interface module, and a financial transaction module, and having a database or cloud for storing information.

In a preferred embodiment, as shown in FIG. 1, the interactive advertising and marketing system 100 comprises a system framework 101 having a viewer interface module 102 for communicating with a viewer through the viewer's video display device 10, a user/viewer interface module 104 in communication with the viewer interface module 102 to receive and transmit information concerning an object, a content collaboration module 106 for allowing users to work together in populating a data bank or "cloud" 108, and a financial transaction module 110 for carrying on a financial transaction between a viewer and a user.

Figure 2:
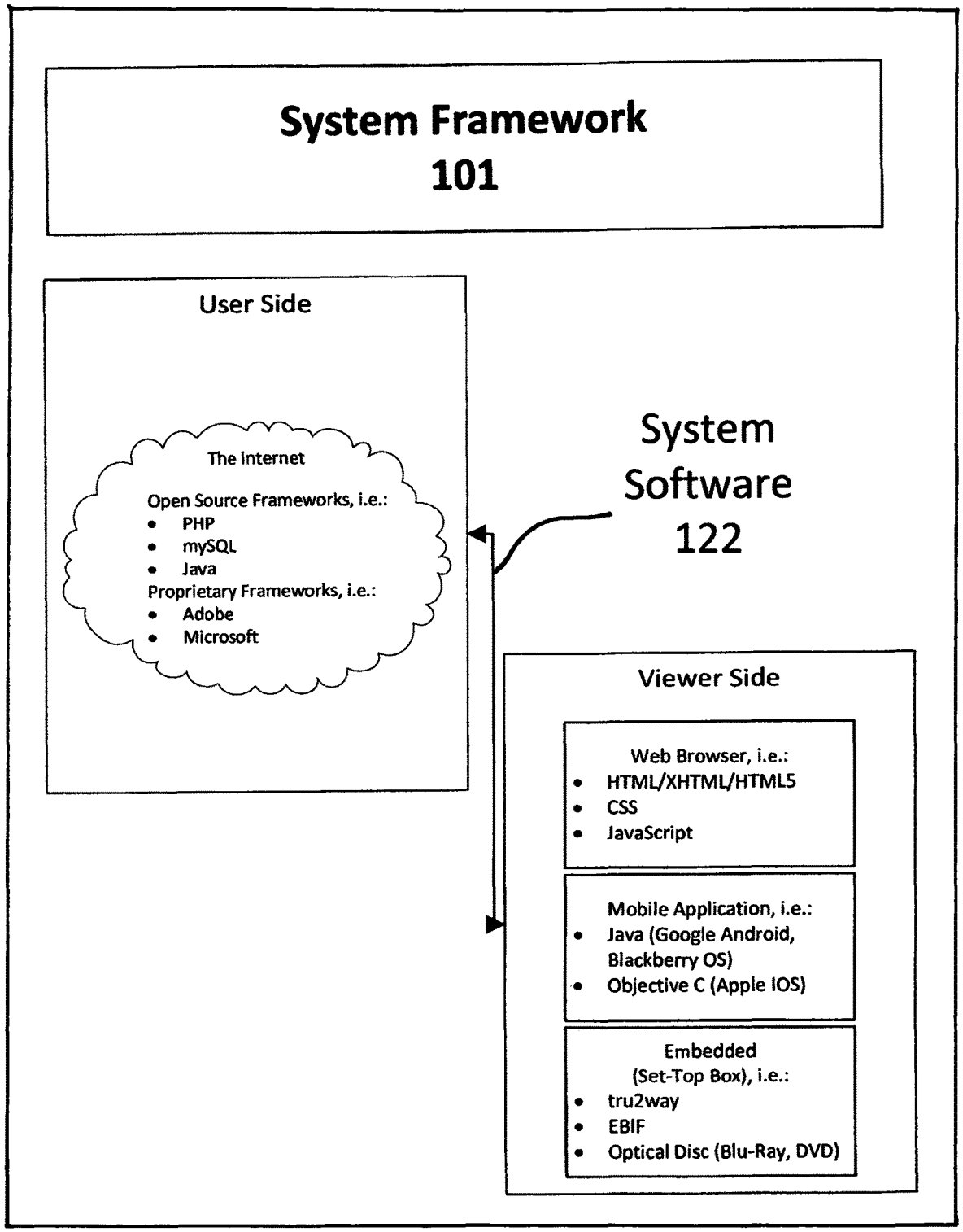
FIG. 2 is a diagrammatic representation showing a preferred embodiment of the system framework of system software for use by users and viewers in implementing the interactive advertising and marketing system of the subject invention.

The viewer interface module 102 operates for receiving incoming messages and alerts (i.e. RSS feed), and dispatches messages and alerts (i.e. HTTP requests, URL/URI encoded streams) from and to a viewer's video display device 10. Further, the viewer interface module 102 also operates to hosts "widgets" (i.e. small runtime applets, such as games or informational dialogues that function independently of one another). Preferably, as shown in FIG. 2, the viewer interface module 102 includes an application programming interface 112 operable for use with interactive television software (such as JAVA TV from Oracle Corporation) and alongside of or on top of other existing software frameworks such as across a broadcast television interface 114 (such as "TRU2WAY" interactive digital cable services system from Cable Television Laboratories, Inc.; ANDROID software stack from Google Inc.; Google TV participatory information system from Google Inc.; and "TIVO" digital video recording by TiVo, Inc.) and/or an Internet (web) application interface 116 that uses a multimedia platform for adding video to Internet web sites 12 (such as ADOBE FLASH from Adobe Systems). The viewer interface module 102 utilizes an appropriate scripting language for controlling one or more applications (such as ECMA SCRIPT from Ecma International). It should be understood that the Internet (web) application interface 116 can operate utilizing any fully-realized runtime code using an appropriate language for structuring and presenting content on the Internet (such as HTML5) thereby allowing the Internet (web) application interface 116 to be accessed and communicate with a variety of web browsers and web sites 12 having meta-file format or container file format (Flash Video). In this way a viewers' video display device 10 can comprise computer displays and other devices accessing video media through various Internet web sites 12 or IPTV.

Figure 3:
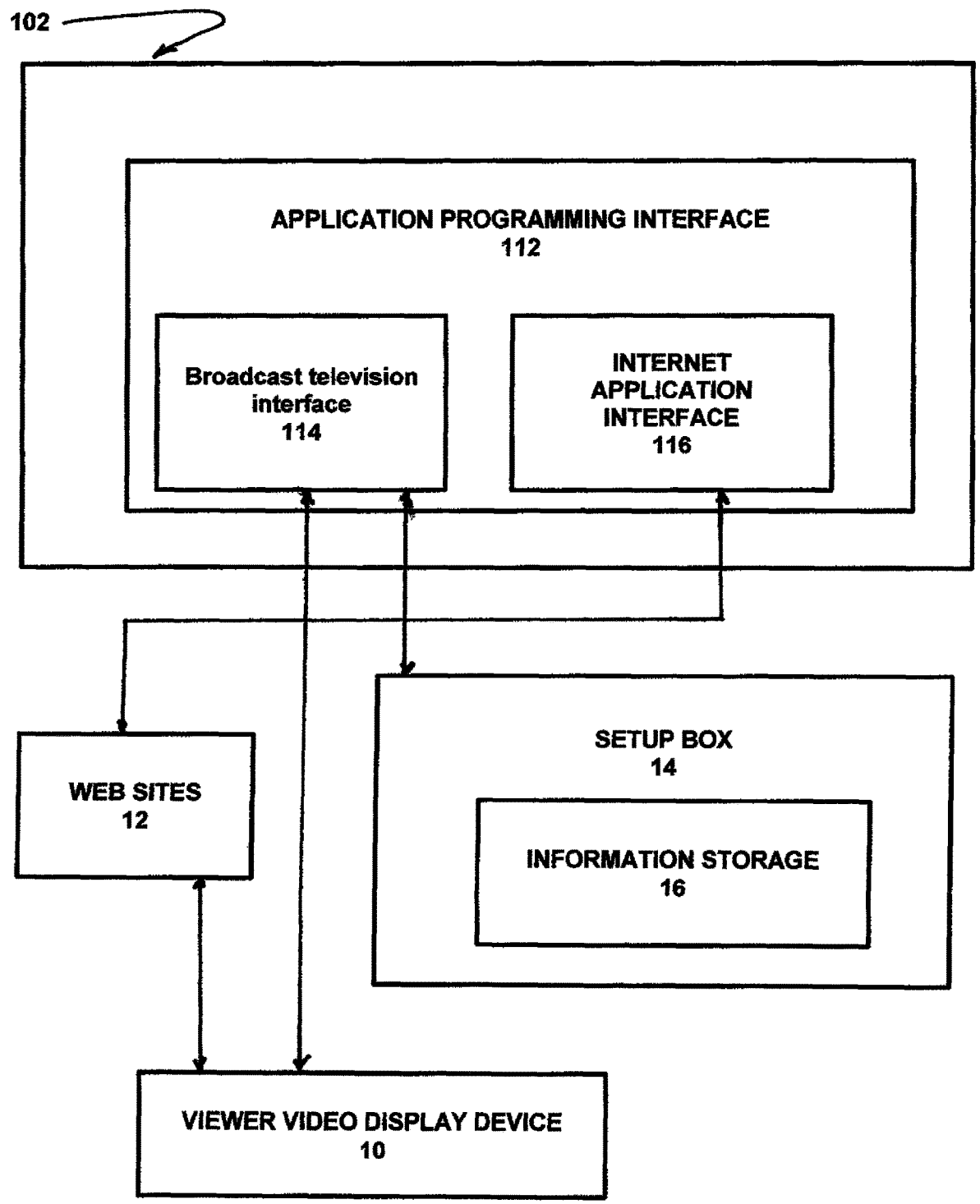
FIG. 3 is a diagrammatic representation showing the application programming interface having a broadcast television interface and an internet application interface for communicating with a viewer's video display device.

As illustrated in FIG. 3, in a preferred embodiment, the application programming interface 112 is coupled to a viewer's video display device 10, such as a television, by either a Set-Top Box 14 or the display device 10 is an Internet-capable television connected to the Internet. In a preferred embodiment of the invention, the television is coupled to the Internet I such that constant interaction is provided. In another preferred embodiment of the invention the viewer's video display device is connected to a set-up box 14 that preferably includes a conventional information storage apparatus 16 capable of intermittently caching relevant information until the application programming interface 112 makes transmittal contact, such as with the Internet I, and operates to transmit stored cached information to the application programming interface module 112. In another preferred embodiment of the invention, the viewer's video display device 10 comprises other forms of devices that can display video media and are connected continuously or periodically to the Internet. Such devices include, cellular telephones, computers, personal digital assistants ("PDA"), video game consoles, and other such devices.

Figure 4:
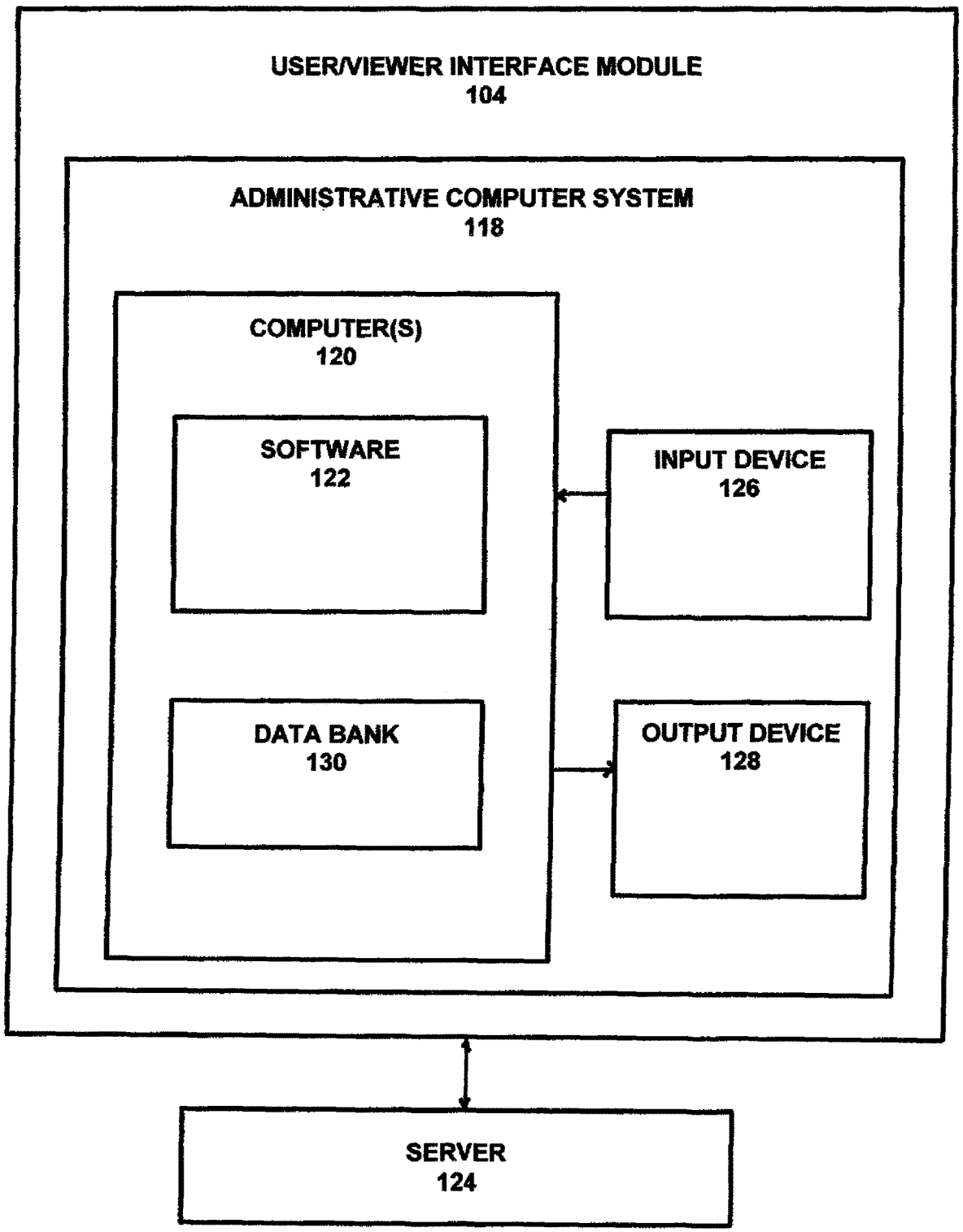
FIG. 4 is a diagrammatic representation of a preferred embodiment of the user/viewer interface module of FIG. 1 showing the administrative computer system.

Referring to FIG. 4, the user/viewer interface module 104 comprises an administrative computer system 118 comprising one or more computers 120 for implementing and operating the system software 122 that operates the framework 101 of the subject invention such that the various modules cooperate together. The user/viewer interface 104 and the viewer interface module 102 are each electrically linked to at least one server 124 connected to the Internet I to assess, retrieve and transmit information. The computer system(s) 118 is electronically coupled to suitable input device 126, like a keypad, touch screen, or any other suitable input device that can accept information, and one or more suitable output devices 128, such as a computer display, printer, and the like. The administrative computer system also includes at least one data bank 130 for storing various information, including information concerning users, viewers, and business information. It should be understood that the administrative computer system 118 can include various combinations of such conventional components, peripherals, and devices. Preferably, the administrative computer system 118 operates under the control of an operating system, such as the WINDOWS operating system developed by Microsoft Corporation or the MACINTOSH operating system developed by Apple Computer Corporation. It should be understood, however, that other operating systems could be utilized to implement the system software 122 of the advertising and marketing system 100 of the present invention.

The system software 122 preferably is a computer-readable medium having computer-readable instructions for performing a method of operating the interactive advertising and marketing system, including providing support for creating and/or editing hotspots, determining coordinates of objects within a video media, and performing and coordinating the activities of the various modules comprising the system. Preferably, the system software 122 is also an interactive, menu and event driven system that cooperates with the server 124 (FIG. 4) for using conventional type of prompt, dialog, and entry windows to guide a user to enter information for facilitating communications and information exchange between individual users, viewers, and the interactive advertising and marketing system 100. As used herein, the term "software" refers to any form of programmed machine-readable language or instructions (e.g., object code) that, when loaded or otherwise installed, provides operating instructions to a machine capable of reading those instructions, such as a computer. The system software 122 of the present invention can be stored or reside on, as well as be loaded or installed from, one or more floppy disks, optical disks, hard disks or any other form of suitable non-volatile electronic storage media and can also be installed by downloading or other form of remote transmission, such as by using Local or Wide Area Network (LAN or WAN)-based, Internet-based, web-based or other remote downloading or transmission methods. It should be understood that the system software 122 can be a single program or can be a combination of existing software such as identified herein that operate together under a framework to perform the operations described herein.

In operation, as illustrated ins FIGS. 1-4, the user/viewer interface module 104 sends and receives messages and data to and from viewers through the viewer interface module 102. The user/viewer interface module 104 can also send and receive messages and data to and from users through the content collaboration module 106. It should be understood that the viewer interface module 102 and the user/viewer interface module 104 operates bi-directionally between a variety of messaging protocols, including Email, SMS text, various social networks, as well as proprietary Internet chat protocols, such as SKYPE and AOL's Instant Messenger system and other similar systems. The messages and data can then be made available to viewer's and user's display devices through the user/viewer interface module 104.

Figure 5:
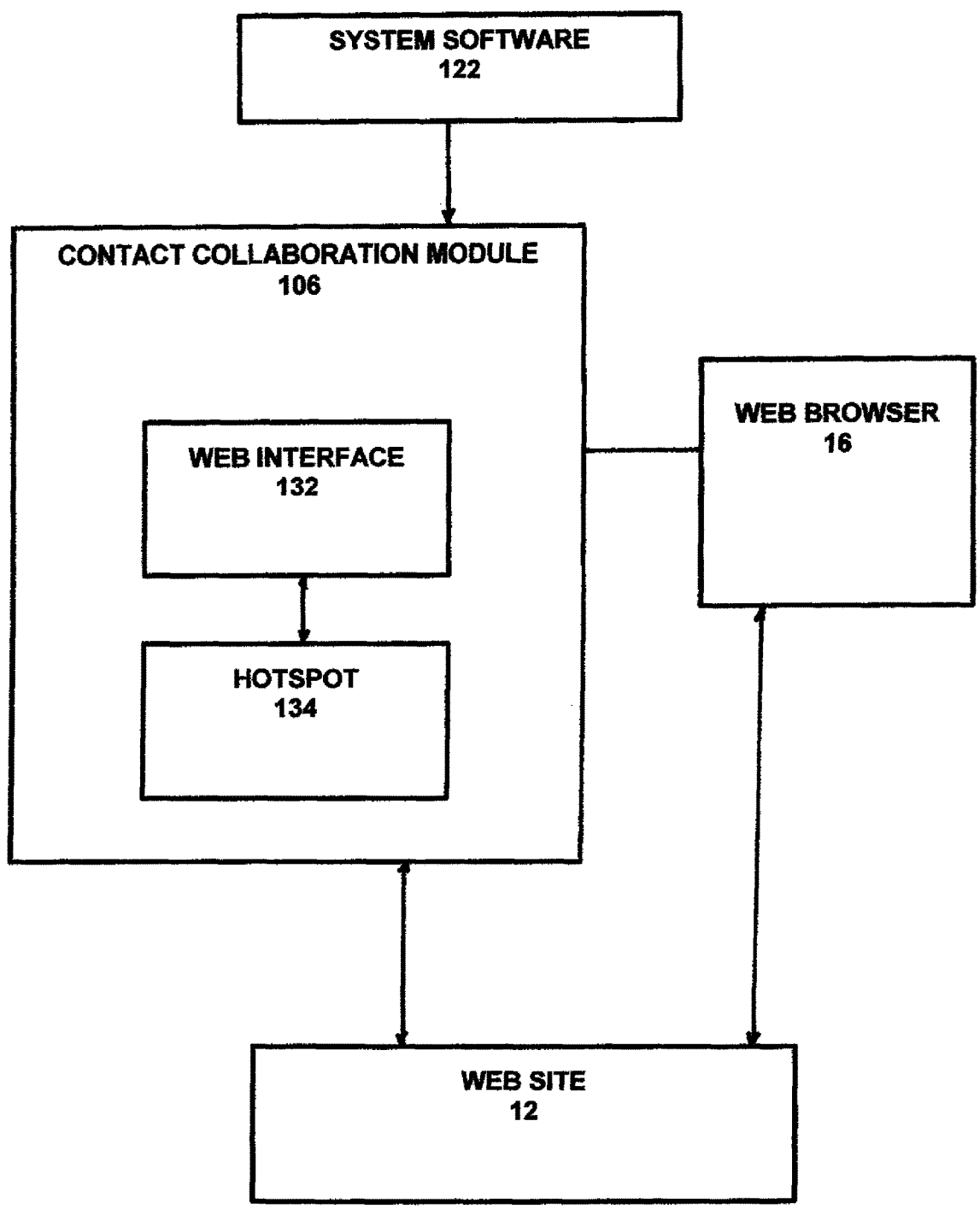
FIG. 5 is a diagrammatic representation illustrating the content collaboration module to create and manage points-of-sale and advertising campaigns as well as video hotspots that can be linked to a user's existing website.

Referring to FIGS. 1 and 5, the content collaboration module 106 is shown for providing services to users. In operation, the content collaboration module 106 allows users to utilize a conventional web browser 16 to create and manage points-of-sale and advertising campaigns. The system software 122 directs the content collaboration module 106 to create a video hotspot 134 that can be linked directly to a user's existing website 12 using standard Uniform Resource Indicator/Locator protocols. The video hotspots 134 are also displayed as a set of visual points along a timeline, which displays a time image. This results in users not needing to know any programming languages to utilize the interactive advertising and marketing system of the present invention. In another preferred embodiment, the system also operates to allow users to import data to the timeline in the form of XML (i.e. time events as SMIL, or shapes (hotspots) as SVG). In another preferred embodiment of the invention, the system software also directs the content collaboration module 106 to operate and allow a user to upload and import graphics that can be displayed, such as over a digital video medium, in real-time. It should now be understood that the graphics can be used as icons, banner ads, messages, and stencils that appear over top of live television. For an illustrative example, a can of beverage can be "re-labeled" with such stencils.

In another preferred embodiment of the interactive advertising and marketing system of the subject invention, the system software 122 also directs the collaboration module 106 to collect and collate reported information and data, which can be transmitted to users. This information can then be used by users in evaluating the advertising value created, hence "analytics." Such information can be obtained from advertising hosts, such as websites that provide video media that can include the number of individuals viewing the video media, track of the number of objects and the particular objects being selected by a viewer of a video media, as well as the demographics of the individuals viewing the video media, and other information that may be of interest to users. This information can then be used to tailor marketing and advertising activities to specifically attract specific types of viewers. Further, users can define parameters to allow them to target viewers falling within a set of demographics.

The financial transaction module 110 of the interactive advertising and marketing system 100 operates to allow viewers to make transactions with specific users. Viewers selecting objects viewed on a video media can select or "click" on the object and purchase it from the user or can request additional information from the user. The financial transaction module communicates with the user/viewer interface module 104 and utilizes various conventional software applications, such as online shopping carts, online banking systems, and other well-known systems for making financial transactions. In another preferred embodiment, the financial transaction module 110 operates in conjunction with conventional e-commerce businesses allowing payments and money transfers to be made through an Internet third-party, such as PAYPAL from eBay Inc.

Figure 6:
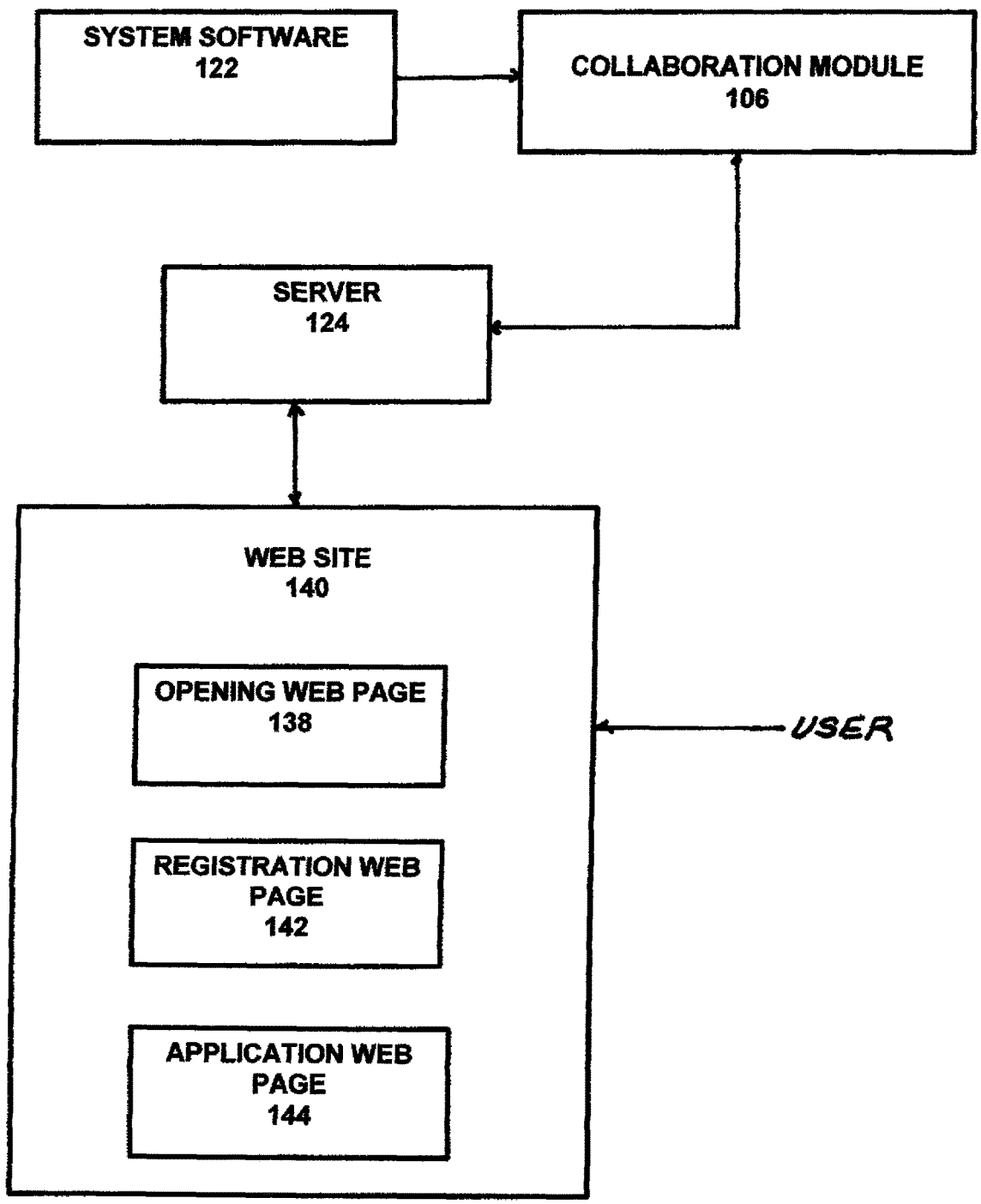
FIG. 6 is a diagrammatic representation illustrating the content collaboration module in communication with a website for use by users.

In a preferred embodiment of the invention, as shown in FIG. 6 a user wishing to utilize the interactive advertising and marketing system 100 first accesses the system through the content collaboration module 106 through a user's portal or access, such as through an interactive opening web-page 138 (e.g. HTML page) accessible through the Internet. The system software 127 operates to permit the user to register itself with the system and to perform the specific operations as fully described. To initiate the system, the user obtains access to system through server 124 via the Internet to obtain access to the system's website 140 hosted by the server 124. The system software 127 directs the server to display the opening web-page 138 (e.g. HTML page) that provides the user with various options that allows a user to perform various operations such as allowing the user to add, subtract and edit the user's various hotspots in various digital video media stored within the database or cloud 108, or to download graphical labels or screens which may be conventionally superimposed into a video media, or obtain business information, such as general information of interest to businesses that may include information relating to various advertising media, available hotspot space, cost information, demographic information, and statistical information relating to the user's advertising (such as number of viewers, demographics of viewers, etc.) stored in the data bank 130 of the administrative computer system 118. The opening web-page 138 also provides means whereby the user can request to become a client for access and use of the system. Upon request by the user, such as by selecting a "sign-up" field, the content collaboration module operates to automatically direct the system server 124 to display on the user's output device 18 a registration web-page 142 (e.g. HTML page). The user can then register with the system and preferably receive a customer identification number and obtain a security password. If the user has already registered with the system, the user can at the opening web-page 138 skip the registration process after inputting the appropriate sign-in information and select an appropriate field at the opening web-page 138 to prompt the content collaboration module 106 to display on the user's output device 18 the operations 144 web-page for use by the user in creating, adding, subtracting, modifying hotspots as well as obtaining various business information.

Figure 7:
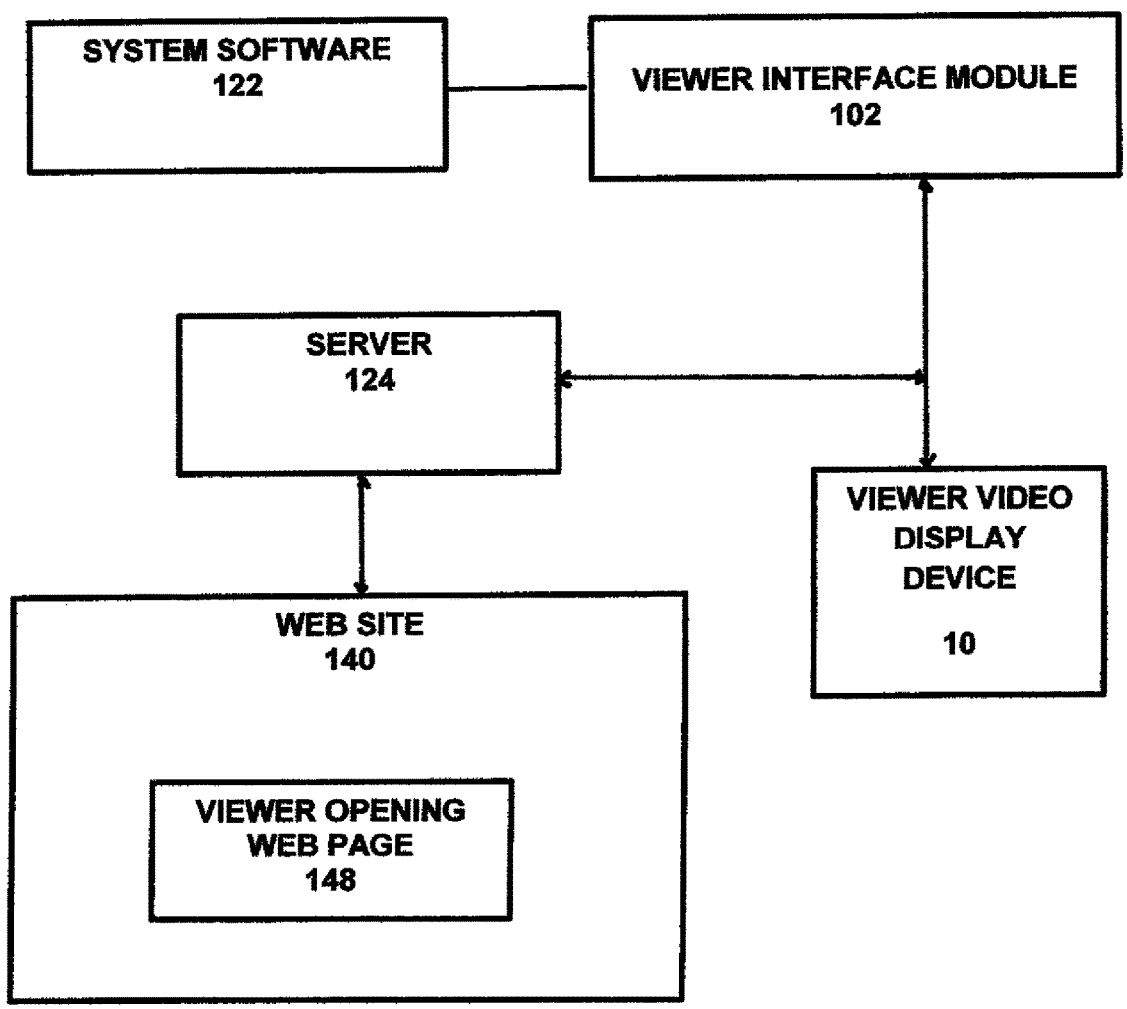
FIG. 7 is a diagrammatic representation illustrating the viewer interface module for communicating with viewers.

In a preferred embodiment of the invention, as shown in FIG. 7, a viewer wishing to utilize the interactive advertising and marketing system first accesses the system through the viewer's interface module 102 through a viewer's portal or access, such as through an interactive web-site 140 (e.g. HTML page) accessible through the Internet or the viewer's display device 10 that is connected to the Internet. The system software 122 than operates to permit the viewer to register with the system, i.e. such as by FACEBOOK, GOOGLE, TWITTER or other such Internet web services. To initiate the system, the viewer obtains access to the system through server 124 via the Internet to obtain access to the system's website 140 hosted by the server 124. The system software 122 directs the server to display a viewer opening web-page 148 (e.g. HTML page) that provides the viewer with information concerning the operation of the system and requests information from the viewer including the types of video display devices that will be used by the viewer, demographic information, and other pertinent information.

Figure 8A:
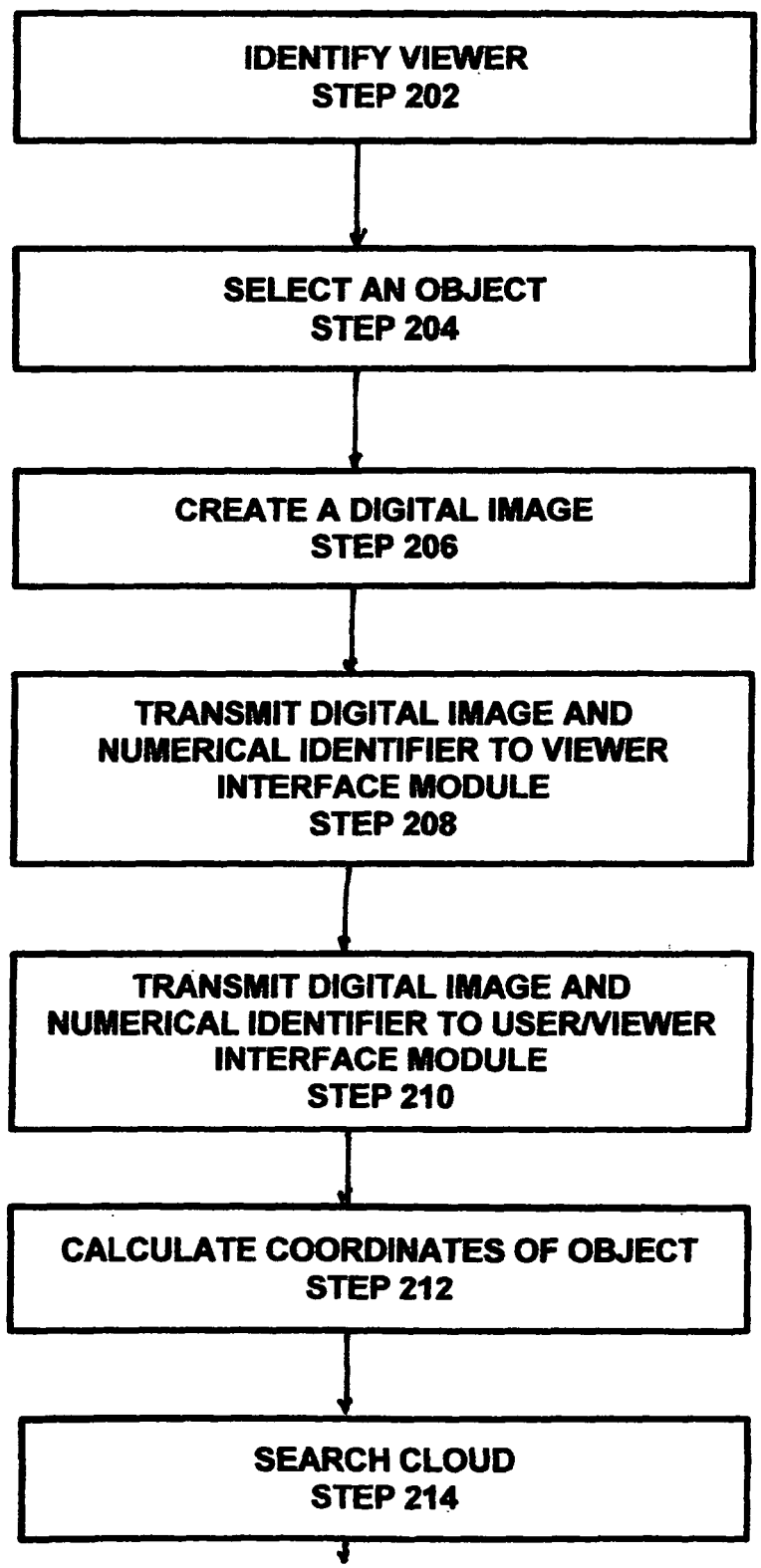
FIG. 8A is a flow diagram illustrating the general methodology of a preferred embodiment showing the procedure being directed using the system software for allowing a viewer to select an object displayed in a video media and "clicking" on the object to purchase or obtain more information on the object.
Figure 8B:
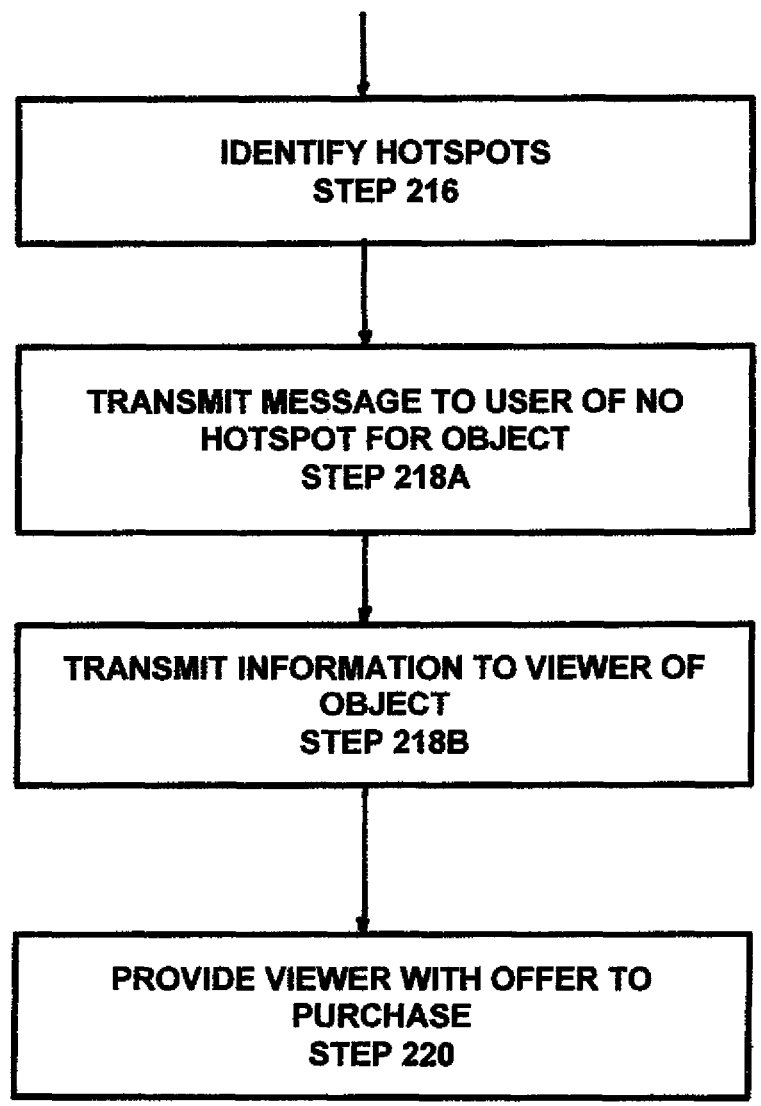
FIG. 8B is a continuation of the flow diagram of FIG. 8A illustrating the general methodology of a preferred embodiment showing the procedure being directed using the system software for allowing a viewer to select an object displayed in a video media and "clicking" on the object to purchase or obtain more information on the object.

In order to better understand how all of the various modules, components and devices cooperate and work together, the following exemplary illustration of the general overall operation of the interactive advertising and marketing system of the subject invention is provided. A user through the user's video display device 10 communicates with the system 100 though the viewer interface module 102. Depending on the type of display device 10 being used by the viewer, the system software 122 directs the application programming interface 112 to utilize either the broadcast television interface 114 or the internet application interface 116 (FIG. 3). It should be understood that the viewer video display device 10 can be Internet ready such that it is in communication with the Internet or utilizes a set-top box 14 to make communication with the viewer interface module 102 via the Internet I. In a preferred embodiment, as illustrated in FIGS. 8A and 8B, the viewer has been provided with identification information such that when the viewer's display makes contact with the viewer interface module 102, the particular viewer is identified (Step 202). Preferably, the viewer's identity is automatically transmitted to the interactive advertising and marketing system 100, such as by use of the set-top box 14 or by the viewer video display device 10.

Figure 9:
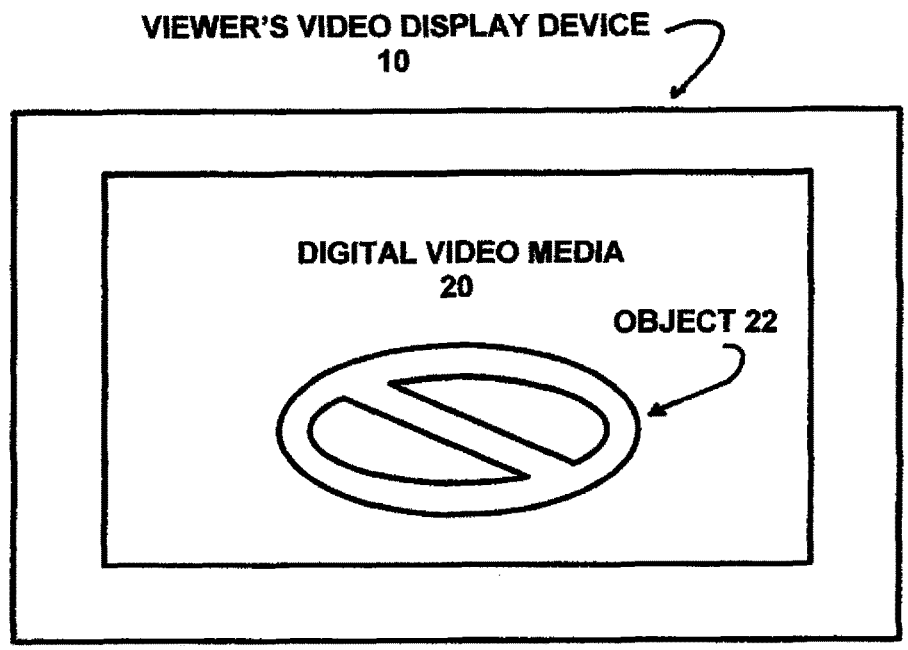
FIG. 9 is a diagrammatic representation illustrating a typical viewer's display device having a video media being displayed thereon and showing an object of interest.

As illustrated in FIGS. 8A-9, in the event a viewer is watching a video media 20 on the viewer's video display device 10, the user may utilize a cursor, mouse, touch (for touch-sensitive displays), motion (for motion-sensitive remotes) or other conventional and nonconventional means for identifying (selecting) an object 22 on the video display device 10, such as by "clicking" on the object 22 in the video media 20 (step 204). As used herein the term "clicking" shall include the selecting of an object using the appropriate means for the viewer's display device. Clicking on the object 22 causes the system software 122 to operate and create an image or "snap-shot" 150 of the video media 20 and the "clicked" object 22 (step 206) which together with identifying information is then transmitted to the viewer interface module 102 as described (step 208). Upon receiving the video image or snap-shot 150, the viewer interface module 102 operates to transmit the video image and the identifying information to the user/viewer interface module 104 (step 210). It should be understood that identifying information may include a numerical identifier 152 for the particular video media, name of the source of the video media, title, time code of the "click", dates, the positional coordinates of the "click", and other relevant information for identifying the particular video media (hereinafter referred to as the "digital image identifier"). It should be understood that in a preferred embodiment of the invention, the viewer can "click" anywhere on the video display 24 of the video media 20 thereby operating as a message to users that can respond as described.

Figure 10:
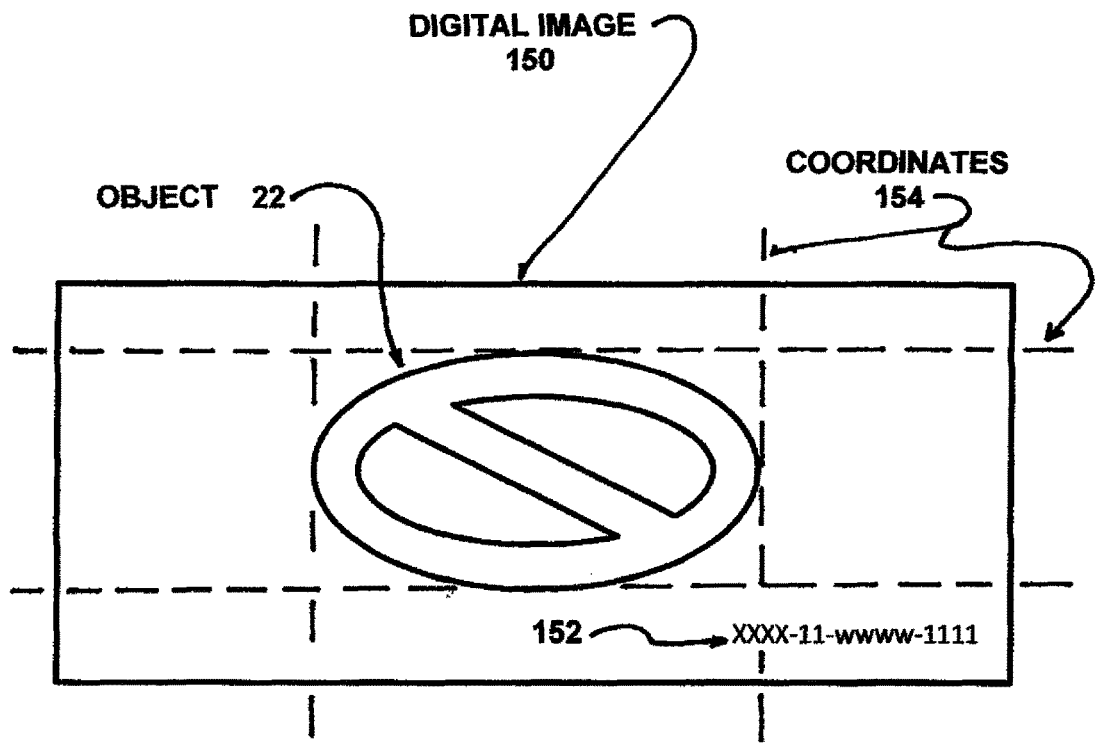
FIG. 10 is a diagrammatic representation illustrating a preferred embodiment of an image or "snap shot" taken of the video media of FIG. 9 showing the object of interest and coordinates of the object being determined in relation to the image.
Figure 11:
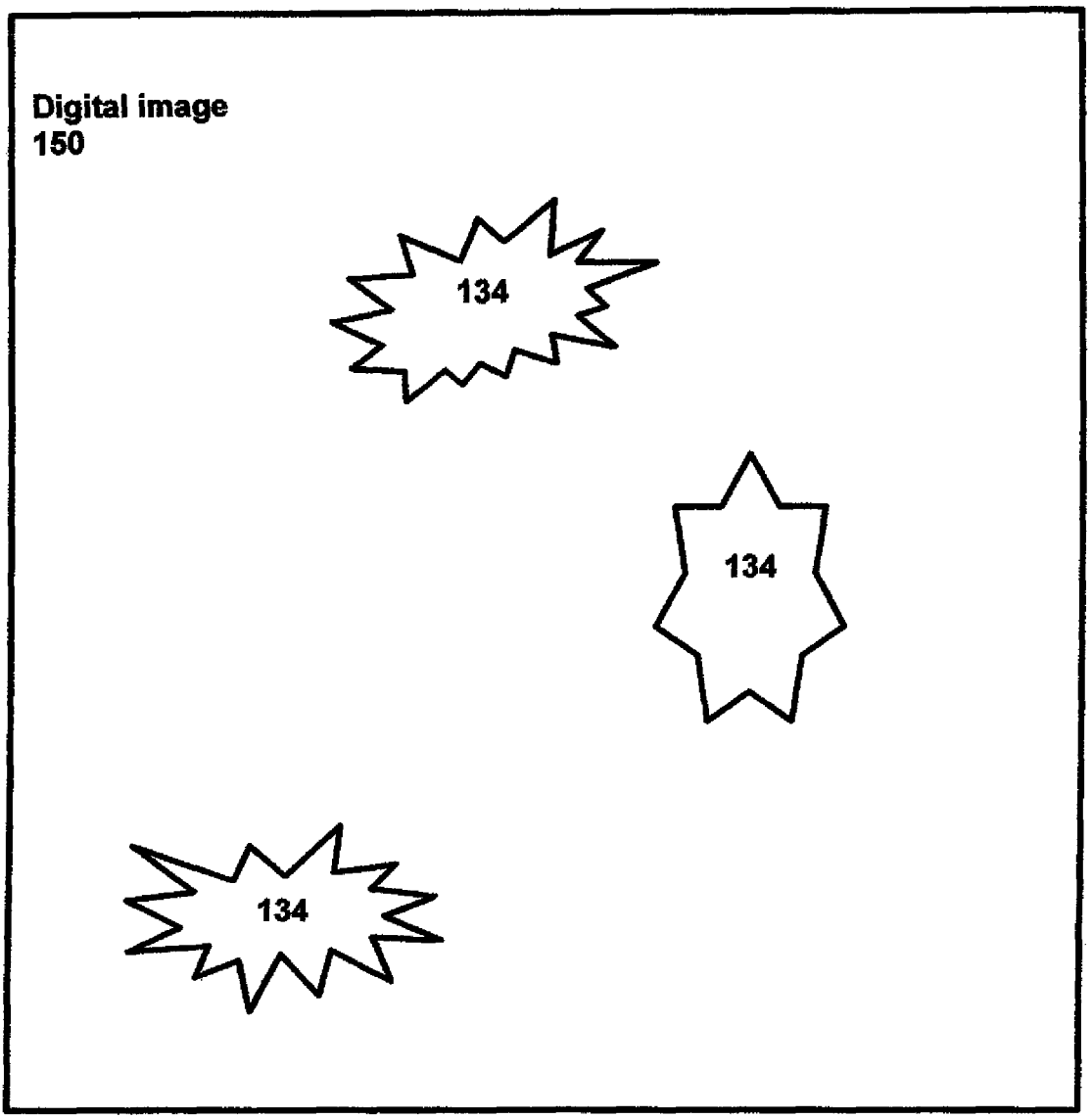
FIG. 11 is a diagrammatic representation illustrating a video image having one or more hotspots.
Figure 12:
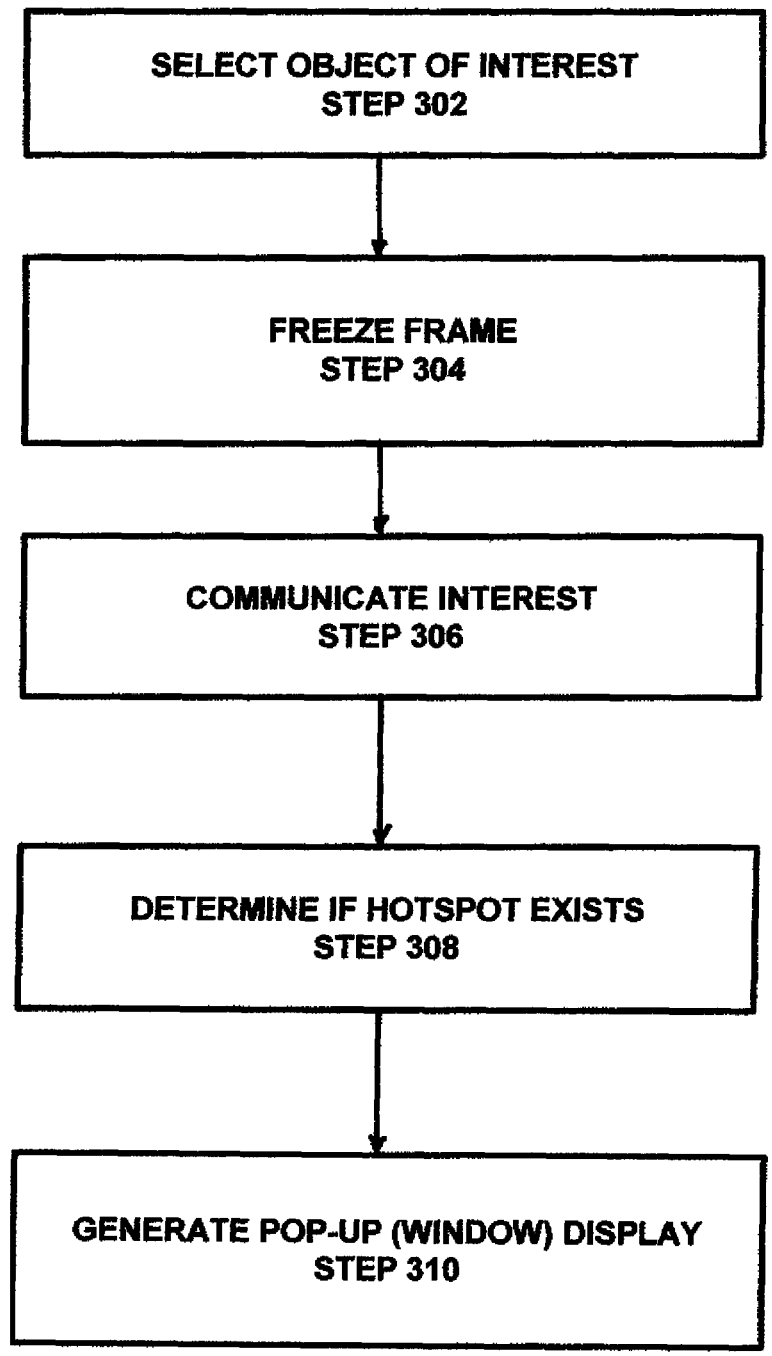
FIG. 12 is a diagrammatic illustration of a preferred embodiment of the invention showing a viewer's display device having a video media being displayed thereon.

The user/viewer interface module 104 after receiving the video image or snap-shot 150 and the numerical identifier 152, the system software 122 operates to cause the system 100 to calculate the coordinates 154 of the "clicked" object 22 identified with respect to the video image or snap-shot 150 (Step 212). The user/viewer interface module 104 also searches the database "cloud" 108 to find and obtain a copy of the video media using the video image or snap-shot 150 together with other information contained in the numerical identifier 152 as references (step 214). The system software 122 then directs the interface module 104 using the copy of the video media and the calculated coordinates 154 of the "clicked" object, identifies if a hotspot 134 (FIGS. 8 and 10) exists at the calculated coordinates 154 for the digital image or snap-shot 150 (step 216) for the object 22. If no hotspot exists for the object 22 in that particular video media 20, the user/viewer interface 104 dispatches a message to the viewer interface module 102 that receives the message and transmits the message to the viewer through the viewer's video display device 10 (step 218a) that no product information is available or other such prompt. If a hotspot 134 does exist for the object 22, the user/viewer interface 104 transmits a message to the viewer interface module 102 that receives the message and transmits the message to the viewer through the viewer's video display device 10 (step 218b) that prompts the opening of a dialogue 156 (FIG. 13) such as a window. The dialogue 156 can request additional information from the viewer, or ask if the viewer wishes to purchase the object, or if the viewer wishes to receive additional information concerning the object. It should be understood that the message to the viewer transmitted by the user/video interface 104 is not limited to any particular request but can be vary depending of the particular object selected and the user. If the viewer wishes to purchase the "clicked" object, viewer so indicates and the system software 122 activates the financial transaction module 110 such that the viewer is connected with a third-party ecommerce merchant (such as AMAZON (Amazon Services LLC), eBay (eBay Inc.), ITUNES (Apple Inc.), PAYPAL (Paypal, Inc.) and the like) for making payment for the selected object (step 220). It should be understood that if no hotspot exists for the selected object, the system can operate to track the object and the viewer and provides information to users that may be interested in responding to or contact the viewer or provides information to users that may be interested in creating a hotspot for the selected object. It should also be understood that if no hotspot exists for the calculated coordinates for the viewer's "click," the system can operate to store the information and allow a user or an automated process to review the stored information and/or allow the user to respond to the viewer.

In another exemplary illustration of a preferred embodiment of the invention, as illustrated in FIGS. 8-12, a video media 20, as shown, is being played on a viewer's video display device 10. At some point during the viewing of the video media 20, the viewer selects "clicks" an object of interest 22 being shown in the video media 20 by using the appropriate device, such as a mouse, wand, pointer, touch sensitive screen or other similar device (step 302). In a preferred embodiment, selection of the object 22 causes the system software 122 to freeze the frame of the video media 20 showing the object 22 (step 304). The viewer can then determine if he/she is interested in purchasing the object 22, obtain additional information about the object or communicate with other viewers concerning the object (step 306). As previously described, the system operates to identify the object 22 and determines if a hotspot 134 exists for the selected object 22 (step 308). In a preferred embodiment of the invention the object 22 would appear as a separate frame while the video media 20 continues being shown on the rest of the viewer's video display 24 or recorded such as by the viewer's video display device 10, or use of a video recorder or other device capable of recording video (not shown). If the system determines and identifies a hotspot 134 for the selected object 22, as shown in FIGS. 8-13, the system software 122 operates to generate a dialogue or window 156 (FIG. 13) on the viewer's video display device 10 (step 310). As shown, in a preferred embodiment the object 22 selected is identified together with other information 158, such as price, manufacture, product description and the like. In another preferred embodiment of the invention, messages and data can be made available to the viewer through the viewer's display device 10 generated by the user/viewer interface module 104. This permits the viewer to receive real-time information concerning the selected object. It should be understood to one skilled in the art that the interactive advertising and marketing system 100 operates such that when a viewer clicks on a selected object the user/viewer interface module 104 can operate to provide users that created a hotspot for the selected object with information concerning the viewer. This information can include the viewer's contact information. In a preferred embodiment the system operates to automatically review the information and provide an automatic response. In another preferred embodiment the information is simply reviewed by a user and the user provides a response to the viewer. In a preferred embodiment of the invention, users can provide viewers advertising that can include downloadable/printable material, such as coupons, maps, product information, and the like, such as by use of the viewer's video display device. In another preferred embodiment of the invention, users can provide the viewer an Internet link or hyperlink for allowing the viewer to view the user's web-page or bring up information, such as through the use of a "pop-up" or window.

Figure 13:
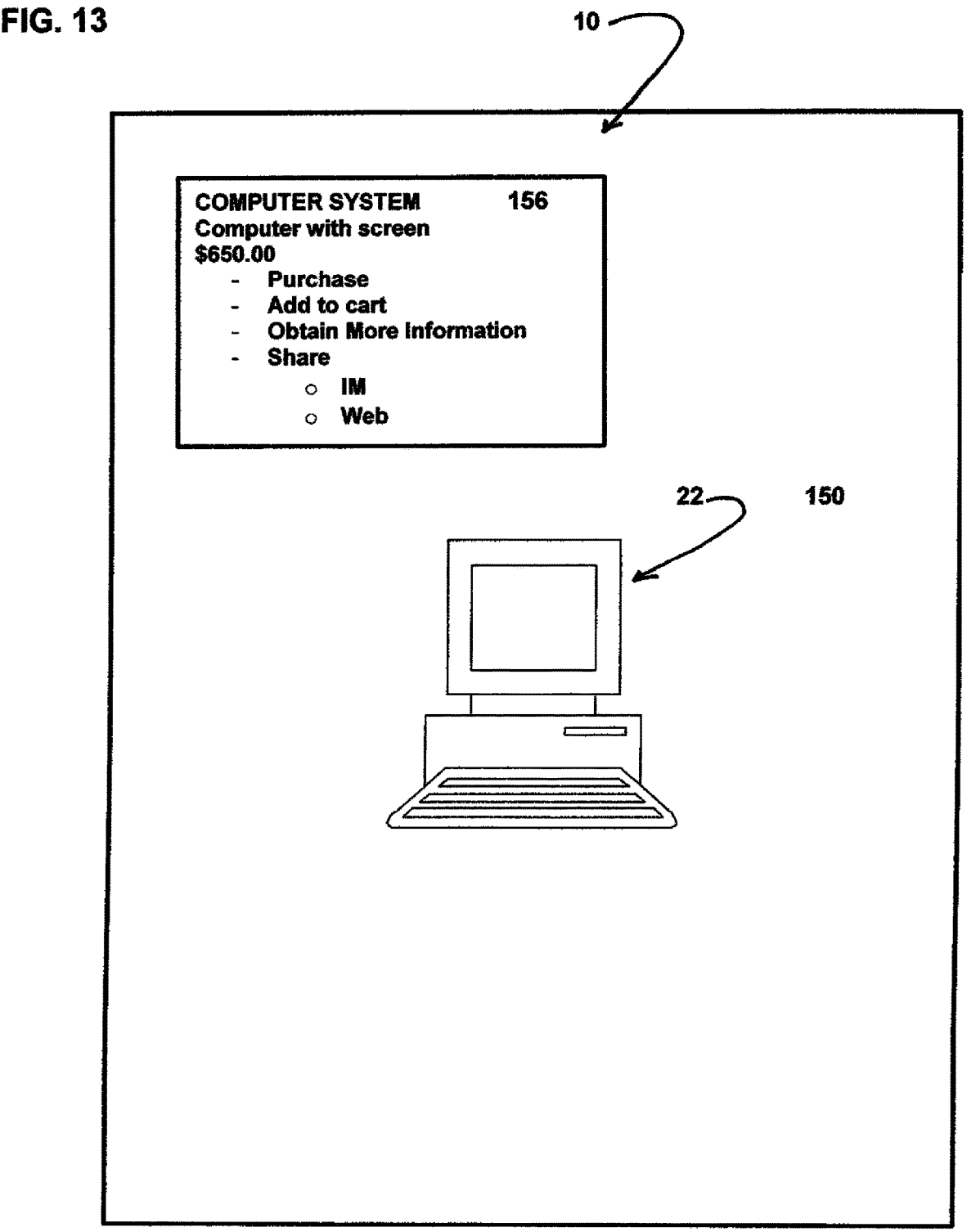
FIG. 13 is a diagrammatic illustration of a preferred embodiment of the invention showing a video image displayed on a viewer's video display device having a dialogue ("pop-up" or window) for providing the viewer with options.

In another preferred embodiment of the invention, the interactive advertising and marketing system operates to allow viewers to exchange messages and preferably video media sharing, including computer-computer, computer-phone, phone-computer, and text messaging video media, to other viewers using conventional messaging systems, such as, but not limited to, TWITTER from Twitter, Inc., YAHOO IM from Yahoo! Inc., YOUTUBE from Google Inc., and FACEBOOK from Facebook, Inc. As shown in FIG. 13, the system operates to allow the viewer to select and utilize the desired messaging system by simply clicking onto the desired system.

Figure 14:
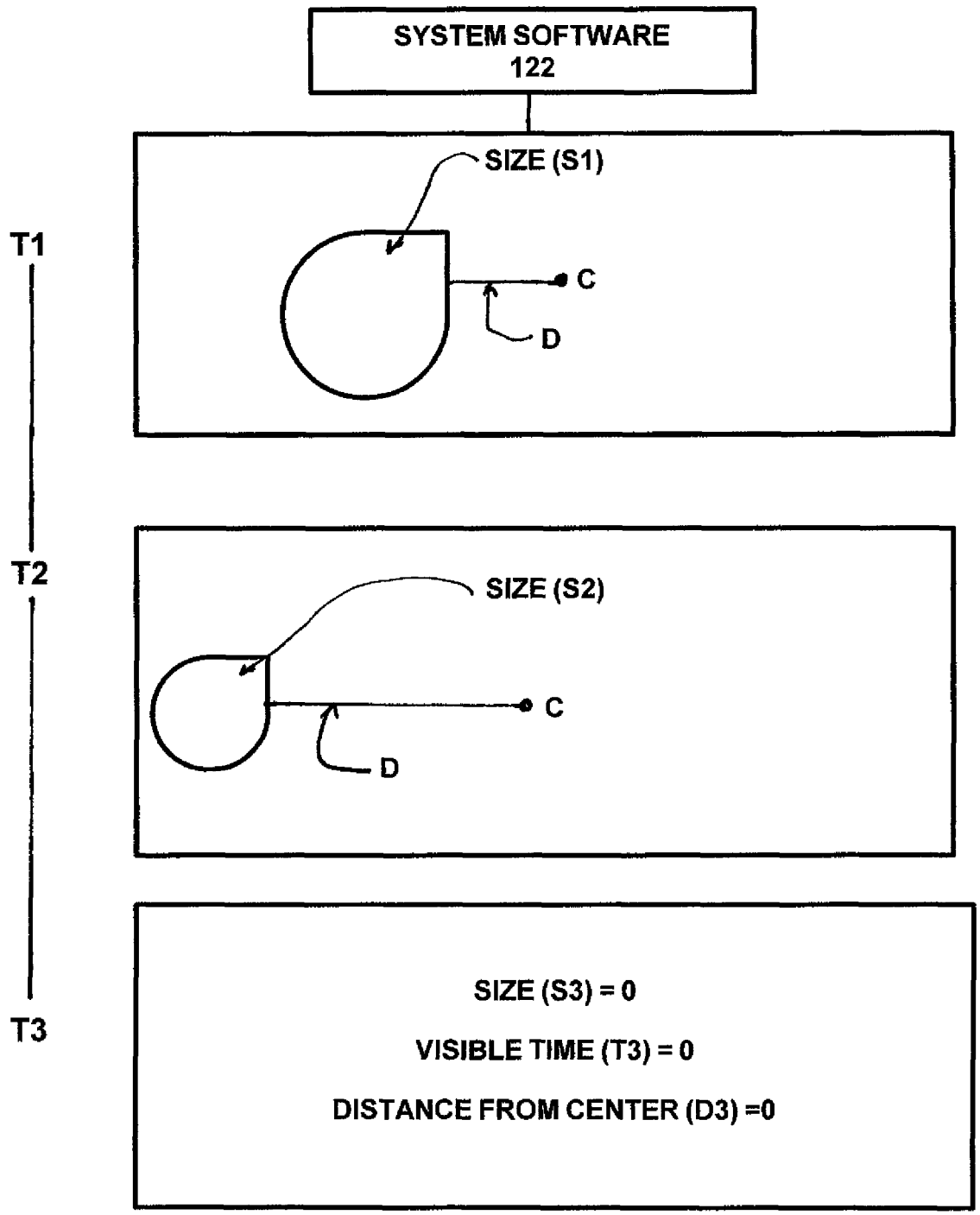
FIG. 14 is diagrammatic illustration of a preferred embodiment of the invention showing a video image display showing three display frames having an object and the system software operating to measure the average visible time, average size of the object and average distance from the center of the display for evaluating the likelihood of a viewer observing an object in a video media.
Figure 15:
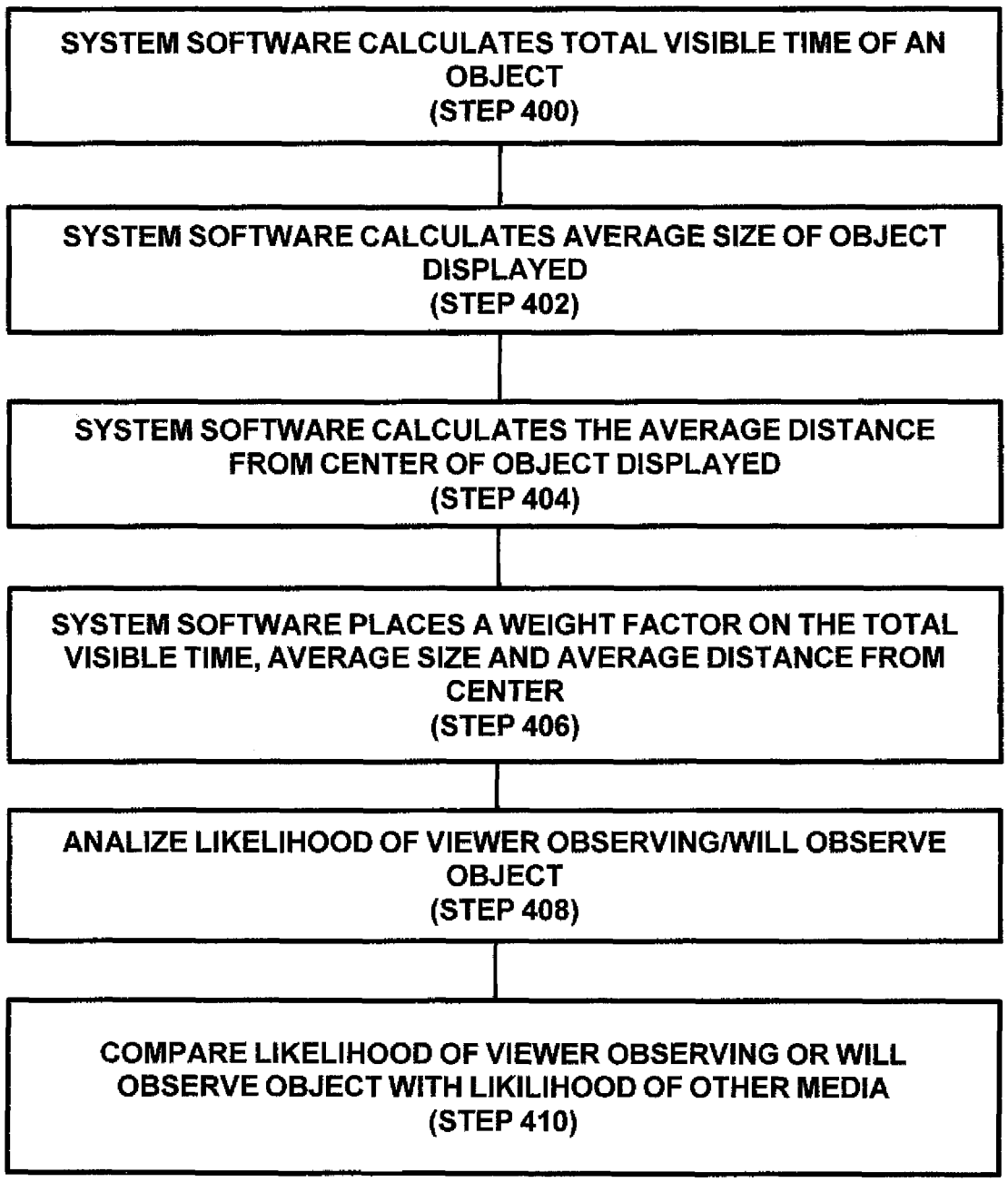
FIG. 15 is a flow chart showing the steps performed by the system software for evaluating the likelihood of a viewer observing an object in a video media.
Figure 16:
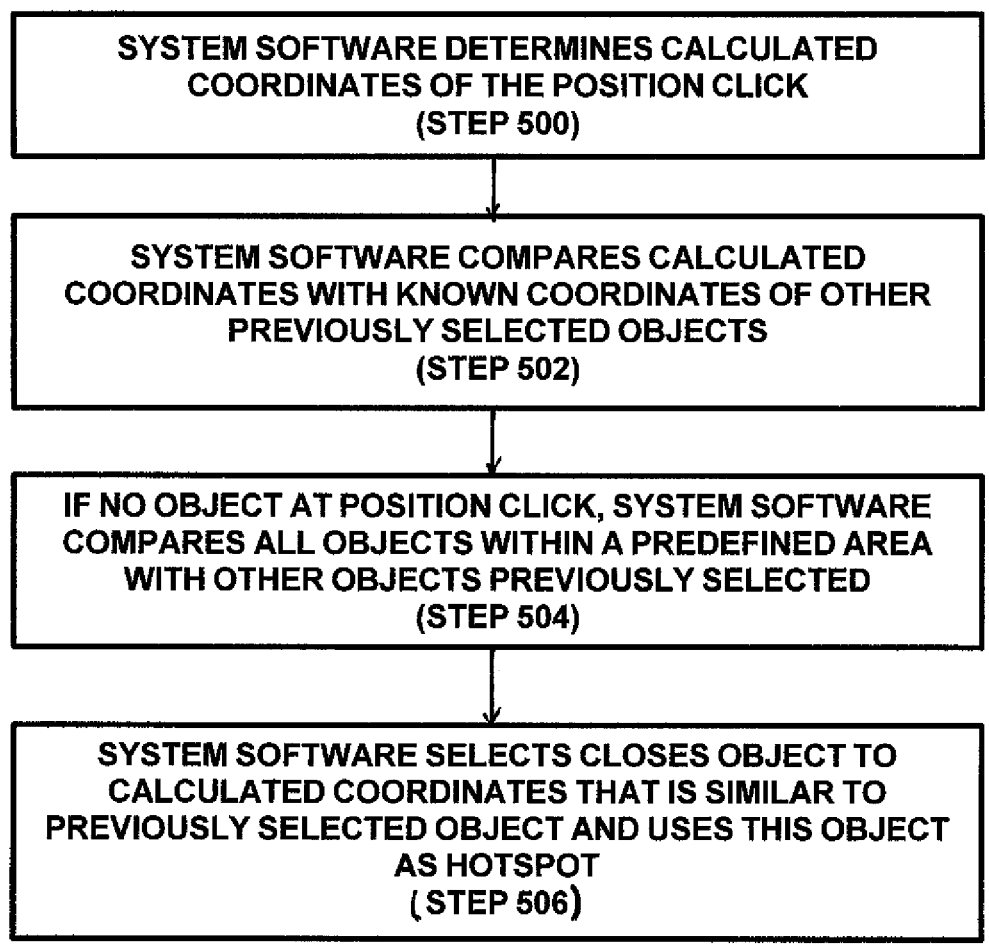
FIG. 16 is a flow chart of a preferred embodiment of the invention showing the steps performed by the system software in determining the object a viewer attempted to select "click on" while watching a video media.

In another preferred embodiment of the invention, the interactive advertising and marketing system operates to predict whether a viewer watching a video media saw an object (such as a product or an advertisement) without requiring the viewer to interact "click" on the object. As illustrated in FIGS. 14 and 15, in order to predict the likelihood that a viewer saw an object 22 within a video media 20, the system software 122 operates to calculate the total visible time ("Total Visible Time") 121 that the object 22 was displayed on the video display 24 (step 400). It should be understood that the more time the object is displayed the more likely that the viewer saw the object. The system software 122 further determines the average size ("Average Size") 123, such as by the number of pixels, that the object 22 uses when displayed (step 402). It should also be understood that the larger the space the object takes on the display screen, the more likely the object was seen by the viewer. The software 122 further operates to calculate the average distance from the center C ("Average Distance From Center") 125 of the video display 24 that the object 22 when shown on the video display 24 (step 404). It should also be understood that the closer that the object 22 is to the center C of the video display 24, the more likely the viewer has seen the object 22. In another preferred embodiment of the invention the Total Visible Time of an object, the Average Size of an object and the Distance From Center of the video display are each weighted, based on viewer data for the particular object (step 406). For example, the Total Visible Time for an object, such as an automobile, may be a greater indication of the likelihood that the object was seen by a viewer than the Distance From Center or Average Size (such as the size (space) that the object takes on the video display). It should now be apparent to one skilled in the art that a user can utilize the analysis to determine the video media that provides the best likelihood that an object will be observed by a viewer (step 408) and compares it with other video media (step 410). For a non-limiting illustration, a user having limited monetary resources can spend such resources to advertise (i.e. provide or identify hotspots for an object) an object (product or advertisement) on video media that provide the greatest likelihood that the user's object (product or advertisement) will be observed by viewers In a preferred embodiment of the interactive advertising and marketing system a viewer's intended selection of an object is determined. For example, a viewer may be interested in a tie being worn by an actor and attempts to use a mouse, smart remote, touch-enabled screen, or other input device to click on the tie. However, because of the speed of the changing scenes, the viewer may miss the intended mark or the opportunity to click on the tie passes and the tie is no longer visually within the viewer's reference frame. As illustrated in FIG. 16, the calculated coordinates 154 of the position "click" on the video display 24 are calculated by the system software 122 and stored in the data bank 130 (step 500). It should now be understood that by storing the calculated coordinates 154 in the data bank 130 allows the calculated coordinates 154 to be obtained from the data bank 130 by users and analyzed asynchronously and independently of the video media's host. The system software 122 then proceeds to compare the calculated coordinates 154 with known coordinates 155 of other objects 22 that were previously selected by the viewer (step 502). In the event a viewer selects ("clicks") a a selected point 119 on the video media 20 that does not contain an object, the system software 122 operates to compare all objects 22 within a predefined area 161 on the video media 20 and compares it to other objects selected ("clicked") by the viewer (step 504) and determines the closest object that is similar to previous objects selected or listed as an interest of the viewer and uses the closest (with regard to interest or similar type objects) object as the selected hotspot (step 506). For a non-limiting illustration, if the closest object is an automobile and the viewer has previously selected automobiles or automotive products, the system software will determine that the object that the viewer was attempting to select was the automobile.

Figure 17:
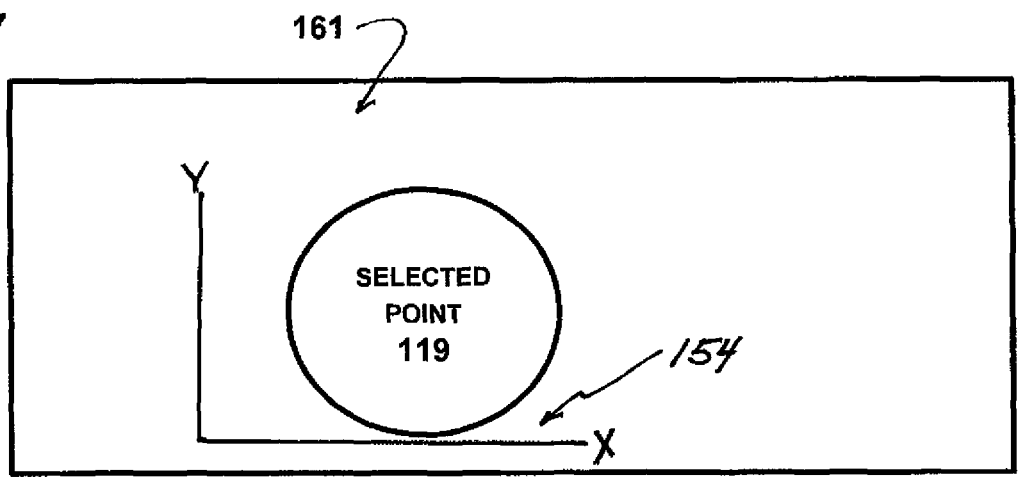
FIG. 17 is a diagrammatic illustration of a preferred embodiment of the invention showing the coordinates of a point (selected point) that a viewer "clicked on" while watching a video media.
Figure 18:
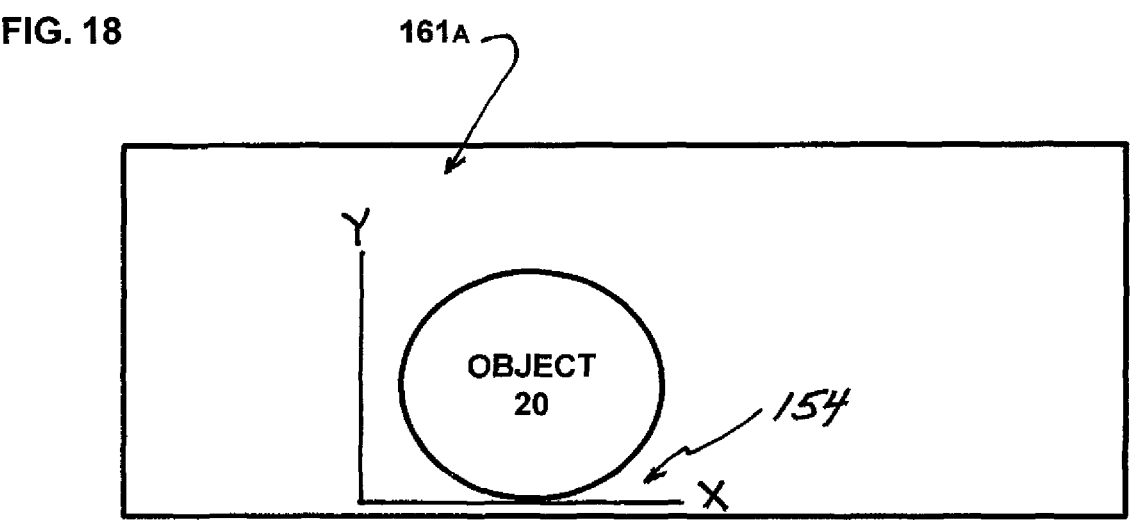
FIG. 18 is an object in a sequential display frame that has the same or nearly the same coordinates of the selected point of FIG. 17.
Figure 19:
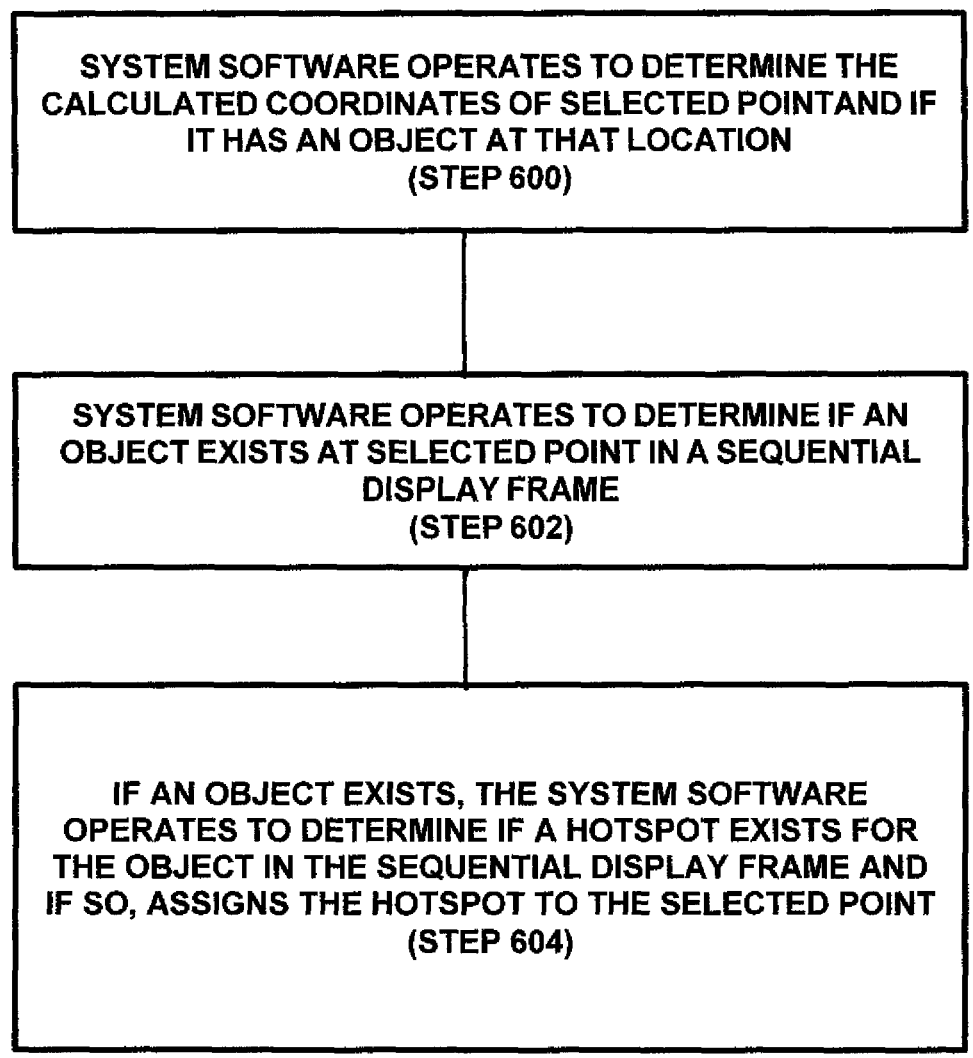
FIG. 19 is a flow chart showing the steps performed by the system software for assigning a hotspot to the selected point of FIG. 17.
Figure 20:
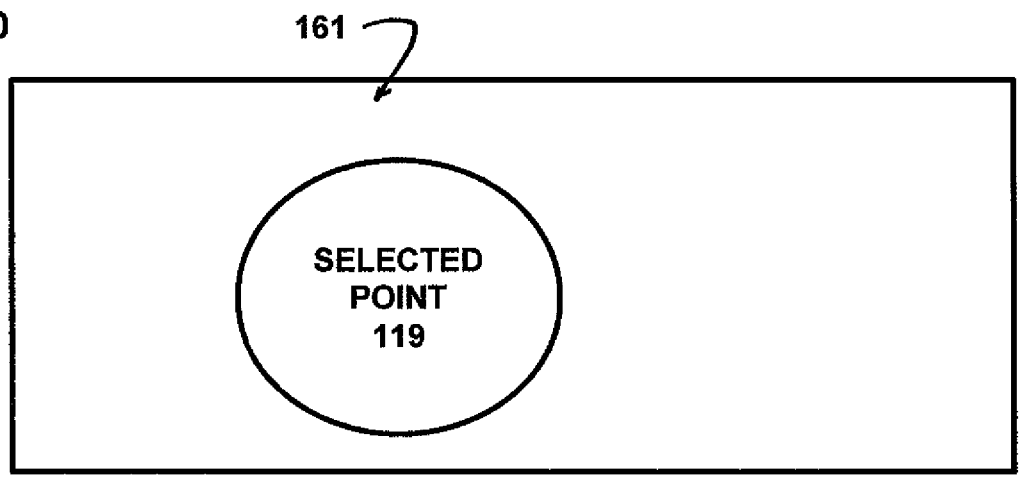
FIG. 20 is a diagrammatic illustration of another preferred embodiment of the invention showing a point (selected point) that a viewer "clicked on" while watching a video media.
Figure 21:
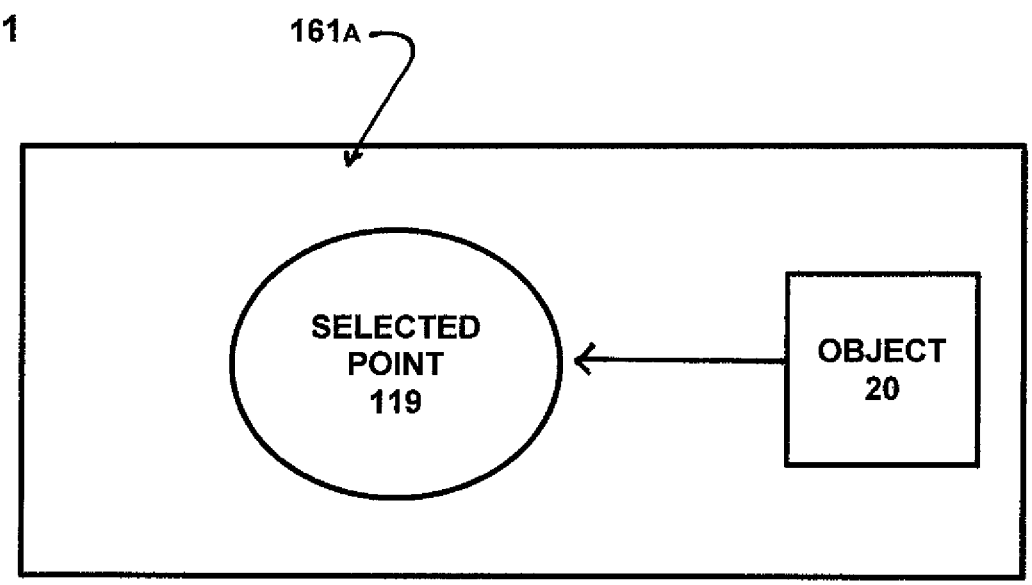
FIG. 21 is a diagrammatic illustration showing the selected point of FIG. 20 showing an object in a sequential display frame moving into or out of the calculated coordinates.
Figure 22:
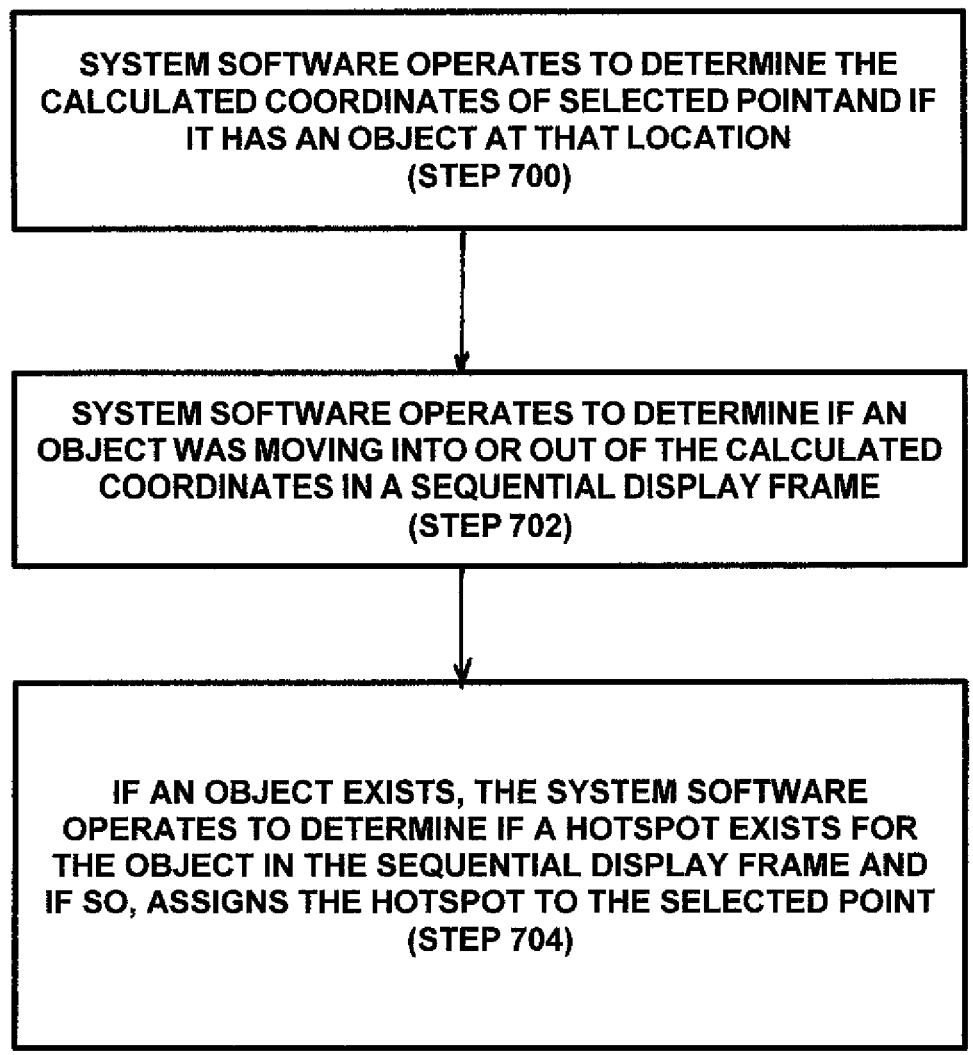
FIG. 22 is a flow diagram showing the steps performed by the system software for assigning a hotspot to the selected point of FIG. 20.
Figure 23:
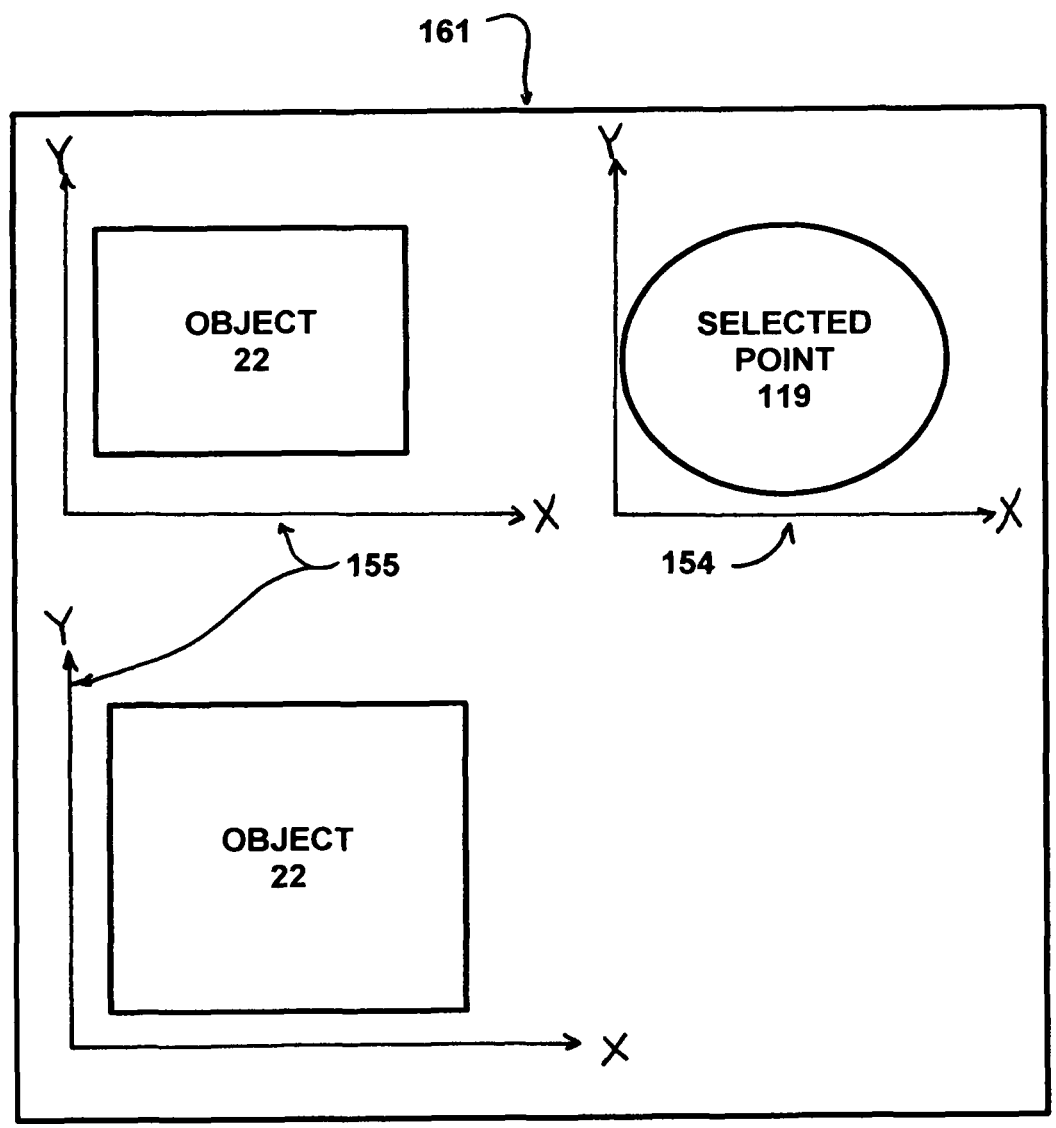
FIG. 23 is another preferred embodiment of the invention showing a point (selected point) that a viewer "clicked on" while watching a video media and having at least two objects appearing on the display frame.
Figure 24:
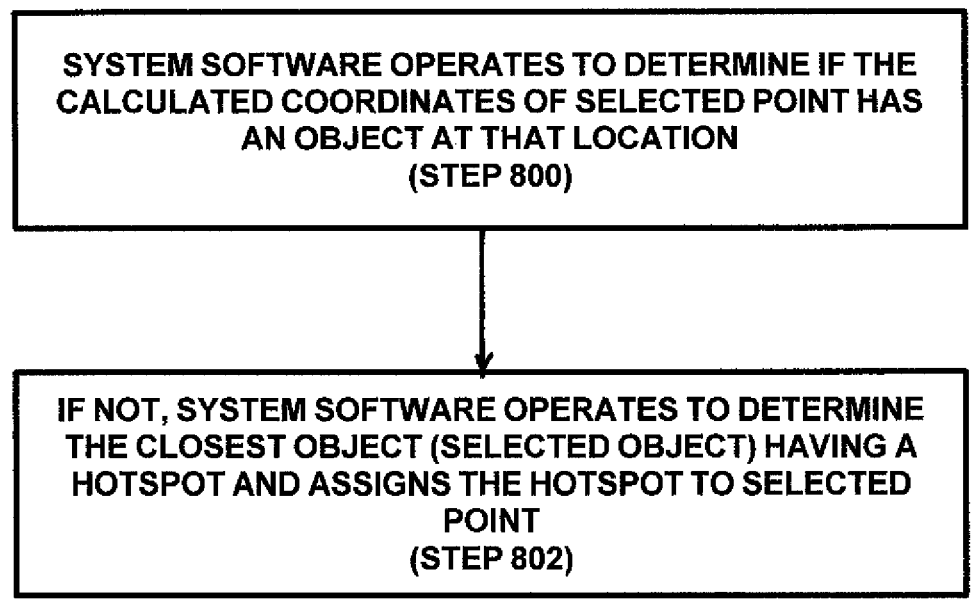
FIG. 24 is a flow diagram showing the steps performed by the system software for assigning a hotspot for the closest object being assigned to the selected point.

In another preferred embodiment, as illustrated in FIGS. 17-19, the location that the viewer "clicked" (selected point 119) has an object 20 at that location (step 600) (As shown in FIG. 17) at a display frame 161. If not, the system software 122 uses the calculated coordinates 154 and examines one or more sequential display frames 161 to determine if an object is located at the calculated coordinates at the sequential display frame 161A (step 602) (As shown in FIG. 18). If so the system software 122 determines if the object 20 in the sequential display frame 161A has a hotspot, if so, the system software assigns that hotspot to the calculated coordinates 154 (step 604). In another preferred embodiment, the system software 122, as illustrated in FIGS. 20-22, operates to calculate coordinates 154 at the selected point 119 and determines if an object is at that location (step 700). If the location at the calculated coordinates 154 does not have a corresponding object, the system software 122 operates to determine if an object 20, in sequential display frame 161 was moving into (towards) or out of (away from) the calculated coordinates 154 (step 702). If so, the system software 122 operates to determine if the object 20 has a corresponding hotspot 134, and if so, assigns the hotspot to the selected point 119 (step 704). For a non-limiting illustration, if an automobile is moving such that the automobile was at the calculated coordinates within a predetermined number of sequential display frames, the system software operates to select the automobile as the selected object thereby utilizing the hotspot for the automobile. In another preferred embodiment, as illustrated in FIGS. 23 and 24, the system software 122 operates to determine if the calculated coordinates 154 of the selected point 119 do not have a corresponding object at that location (step 800), if not, the system software 122 operates to determine the closest object 20 (selected object) in the display frame 161 having a hotspot and assigns the hotspot to the selected point 119 (step 802).

It should now be understood to those skilled in the art that the subject invention is an interactive advertising and marketing system for use by users for advertising and marketing objects in a video media and by viewers for selecting such objects. Preferably the system comprises a cloud having a plurality of hotspots, each hotspot is directed to a corresponding object, a viewer video display device operable for receiving and displaying a video media, a selection device for selecting an object in the video media, and a system framework in communication with the cloud and the viewer display device that is operable for determining if a hotspot exists for the selected object. Preferably, if a hotspot exists for the selected object, the user/viewer module directs the video display device to generate a dialogue for allowing a viewer to correspond with a user. In a preferred embodiment, the viewer video display device is selected from the group consisting of televisions, cellular telephones, computer displays, personal digital assistants, and video game consoles. In one preferred embodiment, the viewer display device is a touch screen tablet computer device, such as an IPAD or IPAD2 from Apple, Inc. The video media would be provided by a cable television operator, such as provided by Time Warner Cable, Inc. Hotspots can then be created by users and overlaid over the video media. In another preferred embodiment of the invention, the viewer display device is a touch screen tablet computer device, such as the IPAD or IPAD 2 from Apple, Inc. The video media is obtained through a website, such as HULU (www.hulu.com) in a video format such as MPEG-4 as specified by the Moving Pictures Expert Group. Hotspots can then be created by users and overlaid over the video media. In a preferred embodiment the video media would be provided by a video streaming service such as NETFLIX from Netflix, Inc. IT should now be understood to one skilled in the art that regardless of the video format provided by such a streaming service, the subject invention would operate to provide hotspots created by users that can be overlaid over the video media. In another preferred embodiment of the invention the system framework operates to allow users to add, subtract, or modify hotspots for objects stored in the cloud. Further, the system framework operates to record the demographics of viewers and video media being viewed by the viewers. Preferably, the system framework also operates to connect the viewer video display device with a user website. In a preferred embodiment of the invention the digital video media is a live broadcast.

A preferred embodiment of the invention is a method of advertising and marketing comprising the steps of identifying a viewer, the viewer selecting an object in a video media, calculating the coordinates of the selected object, using the coordinates to identify any hotspots for the object in the video media, using the hotspot to identify the object and a user associated with the object, and providing a connection whereby a viewer can contact the user. Preferably, the video media is being displayed on a viewer's display device. In a preferred embodiment, a viewer can contact the user in the form of a dialogue, such as a window, appearing on the viewer digital display device. In another preferred embodiment, a viewer can contact the user in the form of a dialogue, such as a window, appearing on the viewer digital display device. In another preferred embodiment, the connection allows a viewer to receive and transmit messages to a user and a viewer to receive and transmit messages to other viewers. Preferably, the method includes the step of uploading graphics to be displayed over the video media.

Another preferred embodiment is a method of advertising and marketing comprising a framework for performing the steps of selecting at least one object in a video media, overlaying a hotspot for each selected object in a video media such that the hotspots overlay the video media, and viewing the video media on a viewer video display by the viewer wherein when the object is selected, the framework operates to provide communication between the user and the viewer.

It should now be apparent that the interactive advertising and marketing system of the subject invention provides an interactive system having software that utilizes a graphic user interface formatted to function with a wide variety of input devices. It should now be apparent to one skilled in the art that the interactive advertising and marketing system of the subject invention allows hotspots to be incorporated across any video media. Unlike prior methods using hotspots whereby video media are incorporated with embedded hotspots, the system of the subject invention utilizes a cloud whereby objects within a video media are selected by a viewer and are identified by the system to determine if a hotspot has been provided for the selected object. In this way the hotspots are basically overlaid onto the video media rather than incorporated into the video media. It should also now be apparent to one skilled in the art that by overlaying hotspots over the video medial (hotspot is acting independent of the video media), rather than by embedding hotspots into a video media, allows hotspots to be utilized for any video media, including live broadcasts. The system allows users to be able to access the system from any ordinary web browser to create and manage points-of-sale and advertising campaigns. Video hotspots can be linked directly to a user's existing website using standard Uniform Resource Indicator/Locator protocols. The hotspots can also be displayed as a set of visual points along a timeline displaying a time index. Further, it should also now be apparent that the system allows users to upload and import graphics that can be displayed over video in real time. Such graphics can be used as icons, banner ads, messages, or stencils that appear over-top of live television as well as recorded video media. The system software also allows for the collecting and collating of data for use by users in analyzing the effectiveness of their advertising. Further, the system operates to allow users to define parameters, such as specific demographics (geographical location, age ranges, gender, etc.).

It should also be understood that the interactive advertising and marketing system permits users and viewers to communicate through the use of various media including through web pages, Emails, TWITTER feeds, cellular transmittals, cellular text messages, Internet instant messages, and social and business network systems.

Further, it should now be apparent that the interactive advertising and marketing system for use by users for advertising and marketing objects in a video media and by viewers for selecting such objects operates to provide users the ability to evaluate advertising effectiveness by determining the likelihood that an object will be observed by the viewer in watching a video media. In addition, the system operates such that if a viewer selects a point (clicks on a point) and an object is not at the coordinates of the selected point on the display frame of the selected point, the system operates to determine the most likely object that the viewer was attempting to click on (select). The system can operate such that the most likely object is provided (assigned) a hotspot of an object having the same or similar coordinates and which appears in a sequential display frame; and/or selects or assigns a hotspot that has been assigned to an object that is moving into or out of the coordinates of the selected point in the same or a sequential display frame; and/or selects or assigns a hotspot that has been assigned to an object that is the closest object having a hotspot to the selected point.

Although the foregoing invention has been described in some detail for purposes of clarity of understanding, it should be apparent that certain changes and modifications may be practiced within the scope of the appended claims. Furthermore, it should be noted that there are alternative ways of implementing the method and system for implementing the method of the present invention. Accordingly, the present embodiments and examples are to be considered as illustrative and not restrictive, and the invention is not to be limited to the details given herein, but may be modified within the scope and equivalents of the appended claims.

I claim:

1. A method of advertising and marketing comprising a framework for performing the steps of:
    at least one viewer using a viewer's display device clicking a selected point on a display frame in a video media;
    wherein the framework performs the steps of:
        calculating coordinates of the selected point;
        using the coordinates of the selected point determines if an object is located at the calculated coordinates;
        wherein if the object is located at the calculated coordinates of the selected point determines if the object has a hotspot;
        wherein if the object at the calculated coordinates of the selected point has a hotspot, uses the hotspot to identify a user associated with the object and provides a connection between the viewer and the user;
        wherein if no object is located at the calculated coordinates of the selected point, uses the calculated coordinates to determine a closest object that is similar in type as a previous object selected by the viewer having a hotspot and assigns a hotspot of the previous object to the calculated coordinates that matches the hotspot of the closest object that is similar in type as a previous object selected by the viewer having a hotspot; and
        provides communication between at least one user associated with the assigned hotspot and the at least one viewer.

2. The method of claim 1 further comprising the step of comparing video media and determining the video media that provides the greater likelihood that an object will be observed by at least one viewer.

3. The method of claim 1 wherein the communication between at least one user and at least one viewer is by at least one internet connection.

4. The method of claim 1 wherein the video media is a live broadcast.

5. The method of claim 1 further comprises the step of obtaining and storing information about a viewer.

6. The method of claim 5 further comprises the step of automatically reviewing the information and providing an automatic response.

7. The method of claim 5 further comprising the step of reviewing the stored information by a user and providing a response to a viewer.

* * * * *